US009697955B2

(12) United States Patent
Honda et al.

(10) Patent No.: US 9,697,955 B2
(45) Date of Patent: Jul. 4, 2017

(54) CAPACITOR DEVICE

(71) Applicants: NIPPON CHEMI-CON CORPORATION, Tokyo (JP); MAZDA MOTOR CORPORATION, Hiroshima (JP)

(72) Inventors: Ikufumi Honda, Tokyo (JP); Hitoshi Ohara, Tokyo (JP); Joji Obara, Tokyo (JP); Seigo Suzuki, Hiroshima (JP); Masayoshi Takahashi, Hiroshima (JP); Akira Sone, Hiroshima (JP)

(73) Assignees: NIPPON CHEMI-CON CORPORATION (JP); MAZDA MOTOR CORPORATION (JP)

( * ) Notice: Subject to any disclaimer, the term of this patent is extended or adjusted under 35 U.S.C. 154(b) by 356 days.

(21) Appl. No.: 14/359,554

(22) PCT Filed: Nov. 22, 2012

(86) PCT No.: PCT/JP2012/080261
§ 371 (c)(1),
(2) Date: May 20, 2014

(87) PCT Pub. No.: WO2013/077389
PCT Pub. Date: May 30, 2013

(65) Prior Publication Data
US 2014/0328008 A1 Nov. 6, 2014

(30) Foreign Application Priority Data

Nov. 22, 2011 (JP) .................................. 2011-255288
Nov. 22, 2011 (JP) .................................. 2011-255289
(Continued)

(51) Int. Cl.
*H01G 5/08* (2006.01)
*H01G 9/00* (2006.01)
(Continued)

(52) U.S. Cl.
CPC ................. *H01G 9/08* (2013.01); *H01G 2/04* (2013.01); *H01G 9/008* (2013.01); *H01G 9/12* (2013.01);
(Continued)

(58) Field of Classification Search
CPC .......... H01G 11/10; H01G 2/04; H01G 11/82; H01G 11/76; H01G 9/28
(Continued)

(56) References Cited

U.S. PATENT DOCUMENTS 5,016,139 A * 5/1991 Stopa ...................... H05K 7/209
307/150
8,064,191 B2 11/2011 Morita et al. ................. 361/328
(Continued)

FOREIGN PATENT DOCUMENTS

JP   S59148071   10/1984   ............ H01M 10/16
JP   S6170360    5/1986    ............ H01M 10/12
(Continued)

OTHER PUBLICATIONS

Japanese Office Action (w/translation) issued in application No. 2012-170494, dated Mar. 30, 2016 (5 pgs).
(Continued)

*Primary Examiner* — Eric Thomas
(74) *Attorney, Agent, or Firm* — Hayes Soloway P.C.

(57) ABSTRACT

A capacitor device has an accommodating case in which a plurality of accommodating parts are formed for accommodating capacitor main bodies. The plurality of accommodating parts are oriented so that the longitudinal directions thereof all face the same direction, and the plurality of capacitor main bodies are accommodated in the accommodating parts in a manner such that the sides having terminal parts are set up in the same orientation. The sides of the capacitor main bodies having the terminal parts are provided
(Continued)

with engaging parts that engage with engaged parts provided to a predetermined element member, and the capacitor main bodies are accommodated all together in the accommodating case in a manner such that the engaging parts are engaged with the engaged parts.

14 Claims, 14 Drawing Sheets

(30) Foreign Application Priority Data

Nov. 22, 2011 (JP) ................................ 2011-255290
Jul. 31, 2012 (JP) ................................ 2012-170494

(51) Int. Cl.
| | | |
|---|---|---|
| *H01G 9/08* | (2006.01) | |
| *H01G 11/10* | (2013.01) | |
| *H01G 11/82* | (2013.01) | |
| *H01G 2/04* | (2006.01) | |
| *H01G 11/76* | (2013.01) | |
| *H01G 9/008* | (2006.01) | |
| *H01G 9/12* | (2006.01) | |
| *H01G 9/28* | (2006.01) | |

(52) U.S. Cl.
CPC ............... *H01G 9/28* (2013.01); *H01G 11/10* (2013.01); *H01G 11/76* (2013.01); *H01G 11/82* (2013.01); *Y02E 60/13* (2013.01)

(58) Field of Classification Search
USPC .................................. 361/541, 522, 328–329
See application file for complete search history.

(56) References Cited

U.S. PATENT DOCUMENTS

| 8,194,393 B2 * | 6/2012 | Inoue | ....................... H01G 2/04 |
| | | | 361/299.1 |
| 2006/0050468 A1 | 3/2006 | Inoue et al. | .................. 361/328 |

FOREIGN PATENT DOCUMENTS

| JP | H0262656 | 5/1990 | ............. H01M 2/02 |
|---|---|---|---|
| JP | 67232 | 1/1994 | ............. H01G 9/00 |
| JP | 2000182894 | 6/2000 | ............. H01G 9/00 |
| JP | 2000286172 | 10/2000 | ............. H01G 11/00 |
| JP | 2004039582 | 2/2004 | ............. H01M 2/10 |
| JP | 2004335829 | 11/2004 | ............. H01G 2/08 |
| JP | 2005094942 | 4/2005 | ............. B60L 11/18 |
| JP | 3960288 | 5/2007 | ............. B60L 11/18 |
| JP | 2007250830 | 9/2007 | ............. H01G 9/06 |
| JP | 2008204989 | 9/2008 | ............. H01G 9/00 |

OTHER PUBLICATIONS

Japanese Office Action (w/translation) issued in application No. 2011-255288, dated Feb. 22, 2016 (5 pgs).
International Search Report issued in corresponding application No. PCT/JP2012/080261, dated Dec. 18, 2012 (4 pgs).
International Preliminary Report on Patentability issued in corresponding application No. PCT/JP2012/080261, dated Jun. 5, 2014 (8 pgs).

* cited by examiner

CAPACITOR DEVICE

TECHNICAL FIELD

The present invention relates to a capacitor device having an accommodating case in which a plurality of accommodating parts are formed for accommodating capacitor main bodies, the plurality of accommodating parts being oriented so that the longitudinal directions thereof all face the same direction, and the plurality of capacitor main bodies being accommodated in the accommodating parts in a manner such that the sides having terminal parts are set up in the same orientation.

BACKGROUND ART

In conventional practice, there are capacitor units in which the body sections of a plurality of electric capacitors are enclosed and incorporated into a holder, and leads of the electric capacitors are connected to a wiring substrate provided on top of the electric capacitors (see Patent Document 1, for example).

PRIOR ART DOCUMENTS

Patent Documents

Patent Document 1: Japanese Patent Publication No. 3960288

SUMMARY OF INVENTION

Problems to be Solved by the Invention

However, in the capacitor unit (the capacitor device) disclosed in Patent Document 1, when the capacitors (capacitor main bodies) are incorporated into a holder (an accommodating case), the orientations of the electric capacitors must be aligned in appropriate positions so that leads (terminals) are connected to a wiring substrate, and the complexity of the work of positioning the leads has been a problem. It has also been an important objective in vehicle applications for electric capacitors, connection members (bus bars) connected to electric capacitors, and circuit substrates having balancing circuits for controlling charging current or voltage between electric capacitors connected to the connection members, to be better fixed within capacitor units.

The present invention was devised with focus on such problems, and an object of the invention is to provide a capacitor device in which the positions of the terminals of the capacitor main bodies can be easily aligned, members and the like for connecting the capacitor main bodies or the terminals of the capacitor main bodies to each other can be better fixed in place, and the manufacturing work can be simplified.

Means for Solving these Problems

To solve these problems, a capacitor device according to an aspect of the present invention is:

a capacitor device having an accommodating case in which a plurality of accommodating parts for accommodating a capacitor main body are formed, the accommodating parts being oriented so that the longitudinal directions thereof face the same direction, and the capacitor main bodies being accommodated in the accommodating parts with terminal part sides thereof arranged in the same orientation;

the capacitor device characterized in that the terminal part sides of the capacitor main bodies are provided with engaging parts that engage with engaged parts provided to a predetermined element member, and the capacitor main bodies are accommodated all together in the accommodating case with the engaging parts engaged with the engaged parts.

According to this aspect, the engaging parts of the capacitor main bodies can be engaged with the engaged parts of the element member, the capacitor main bodies can be accommodated in the accommodating parts while relatively positioned by the element member, the terminal parts can be arranged in a pre-established specified manner, the positions of the terminal parts of the capacitor main bodies can be easily aligned by the element member, members such as a circuit substrate or connecting members for connecting the terminal parts of the capacitor main bodies together are easily connected to the terminal parts, the capacitor main bodies are easily accommodated in the accommodating case, and the work of manufacturing the capacitor device can be simplified. The members such as the capacitor main bodies, connection members, and circuit substrate can be better fixed in place, and this is particularly effective in cases of the capacitor device being applied to a vehicle subject to vibration.

The capacitor device according to another aspect of the present invention is characterized in that the element member has positioning means for positioning the element member and the accommodating case, and the capacitor main bodies are positioned relative to the accommodating case due to the element member being positioned within the accommodating case by the positioning means.

According to this aspect, the capacitor main bodies are positioned in the accommodating case via the element member because the element member is positioned relative to the accommodating case by the positioning means.

The capacitor device according to another aspect of the present invention is characterized in that insertion holes into which the terminal parts of the capacitor main bodies are inserted are formed in the element member, and the terminal parts protruding from the insertion holes are electrically connected by a connection member.

According to this aspect, the insertion holes of the element member can also be used as engaged parts, the terminal parts of the capacitor main bodies can also be used as the engaging parts, the connection members are used to electrically connect the terminal parts of the capacitor main bodies, the capacitor main bodies are all connected together by the center element member and the connection members, the capacitor main bodies are easily accommodated in the accommodating parts, and the work of manufacturing the capacitor device can be simplified.

The capacitor device according to another aspect of the present invention is characterized in that the engaging parts are provided to positions such that the capacitor main bodies are non-rotationally symmetrical about the longitudinal axes thereof.

According to this aspect, when the capacitor main bodies are non-rotationally symmetrical about the longitudinal axes thereof due to the engaging parts and the engaging parts of the capacitor main bodies are engaged with and attached to the engaged parts of the element member, the capacitor main bodies can be prevented from being attached with the anode terminal parts and the cathode terminal parts reversed.

The capacitor device according to another aspect of the present invention is characterized in that pressure release means for releasing the pressure of gas produced within the capacitor main bodies is provided in proximity to the terminal parts, and release holes are formed in the element member in positions corresponding to the pressure release means.

According to this aspect, the gas released from the pressure release means is not blocked by the element member, and the gas can be safely released from the release holes.

The capacitor device according to another aspect of the present invention is characterized in being provided with connection members and/or a circuit substrate for connecting the terminal parts of the capacitor main bodies together, and the connection members and/or the circuit substrate are provided with engaging parts for engaging with the engaged parts of the element member.

According to this aspect, the connection members and/or the circuit substrate can be arranged in a pre-established specific manner, the positions of the connection members and/or the circuit substrate can be easily aligned by the element member, the connection members and/or the circuit substrate are easily connected, and the work of manufacturing the capacitor device can be simplified.

The capacitor device according to another aspect of the present invention is characterized in that the element member comprises fixing member for fixing the element member to the accommodating case.

According to this aspect, the capacitor main bodies are fixed to the accommodating case via the element member because the element member is fixed to the accommodating case by the fixing member.

The capacitor device according to another aspect of the present invention is characterized in that the fixing member is provided to an area enclosed by the plurality of engaged parts in the element member, and the fixing member is fixed to a fixing base part of the accommodating case.

According to this aspect, the element member can be fixed in a stable manner because the element member is fixed to the fixing base part of the accommodating case by the fixing member provided in the area enclosed by the plurality of engaged parts.

The capacitor device according to another aspect of the present invention is characterized in that the element member is circular in shape, and the plurality of fixing member are arranged aligned around the circumferential direction on the peripheral edge of a middle hole formed in the middle of the element member.

According to this aspect, when a load or vibration acts on the element member from other members such as the capacitor main bodies connected to the element member, the stress caused by the load or vibration can be prevented from concentrating in the middle of the element member, the stress is dispersed among the plurality of fixing member, and the fixing member can therefore be prevented from weakening. The element member can also be reduced in weight and further strengthened due to the element member having a circular shape.

The capacitor device according to another aspect of the present invention is characterized in that the positioning means is an interlocking part that interlocks with an interlocked part formed between adjacent accommodating parts in the accommodating case, and the element member is positioned relative to the accommodating case with the interlocking part in an engaged state with the interlocked part.

According to this aspect, the element member and the accommodating case can be positioned relative to each other with precision, the capacitor main bodies engaged with the element member can be arranged accurately within the accommodating parts, and because the interlocked parts are formed between adjacent accommodating parts, the interlocked parts do not interfere when the capacitor main bodies are accommodated in the accommodating parts.

The capacitor device according to another aspect of the present invention is characterized in that each of the accommodating parts has a shape that matches the external shape of the capacitor main bodies, and the internal peripheral surfaces of the accommodating parts are tapered surfaces that narrow towards the bottoms.

According to this aspect, the bottom sides of the capacitor main bodies are positioned by the narrowing tapered surfaces of the internal peripheral surfaces of the accommodating parts in a state such that the opening sides of the accommodating parts have been enlarged to easily fit the capacitor main bodies into the accommodating parts, the capacitor main bodies accommodated in the accommodating parts of the accommodating case can be prevented from wobbling, gaps of uniform width can be formed between the internal peripheral surfaces of the accommodating parts and the external peripheral surfaces of the capacitor main bodies, and when the gaps are filled with the resin material, the resin material can be filled uniformly without any unevenness.

The capacitor device according to another aspect of the present invention is characterized in that each of the internal peripheral surfaces of the accommodating parts is provided with a plurality of convexities that protrude toward the capacitor main bodies and are arranged evenly in the circumferential directions of the internal peripheral surfaces of the accommodating parts.

According to this aspect, the capacitor main bodies are held in positions in the middles of the accommodating parts by the convexities in the internal peripheral surfaces of the accommodating parts, and gaps of uniform width can be formed in the circumferential directions between the internal peripheral surfaces of the accommodating parts and the external peripheral surfaces of the capacitor main bodies.

The capacitor device according to another aspect of the present invention is characterized in that the capacitor main bodies are accommodated in the accommodating parts from the openings of the accommodating case, the openings are closed by closing plates, the accommodating case has a lead-out hole for leading the gas released from the pressure release means provided to the capacitor main bodies out of the accommodating case, the lead-out hole being provided to a position enclosed by the accommodating parts, the accommodating parts being integrally linked together, and a hollow part being provided for leading the gas led out from the lead-out hole to the exterior.

According to this aspect, the lead-out hole, which leads gas released from the pressure release means of the capacitor main bodies out of the accommodating case, is enclosed by the integrally linked plurality of accommodating parts, the lead-out hole is disposed on the inner side of the hollow part formed by the plurality of accommodating parts, the lead-out hole stays unexposed to the exterior of the accommodating case, and external dust and water can be prevented from entering the accommodating case through the lead-out hole.

The capacitor device according to another aspect of the present invention is characterized in that the accommodating parts are arranged in a circle, and the lead-out hole is provided in the middle of the accommodating parts.

According to this aspect, the distance to the lead-out hole is the same from each pressure release means of the capacitor main bodies accommodated in the accommodating parts, and the released gas can reach the lead-out hole when the gas is released from the pressure release means of any capacitor main body.

DESCRIPTION OF EMBODIMENTS

The aspects for carrying out the capacitor device according to the present invention are described below based on the embodiments.

Embodiment 1

The capacitor device according to Embodiment 1 is described with reference to FIGS. 1 through 10. The symbol 1 in FIG. 1 denotes a capacitor device to which the present invention is applied. In the present embodiment, two capacitor devices 1 are linked together, one on top of the other. These capacitor devices 1 are primarily designed to be installed in machinery such as a vehicle.

Figure 1:
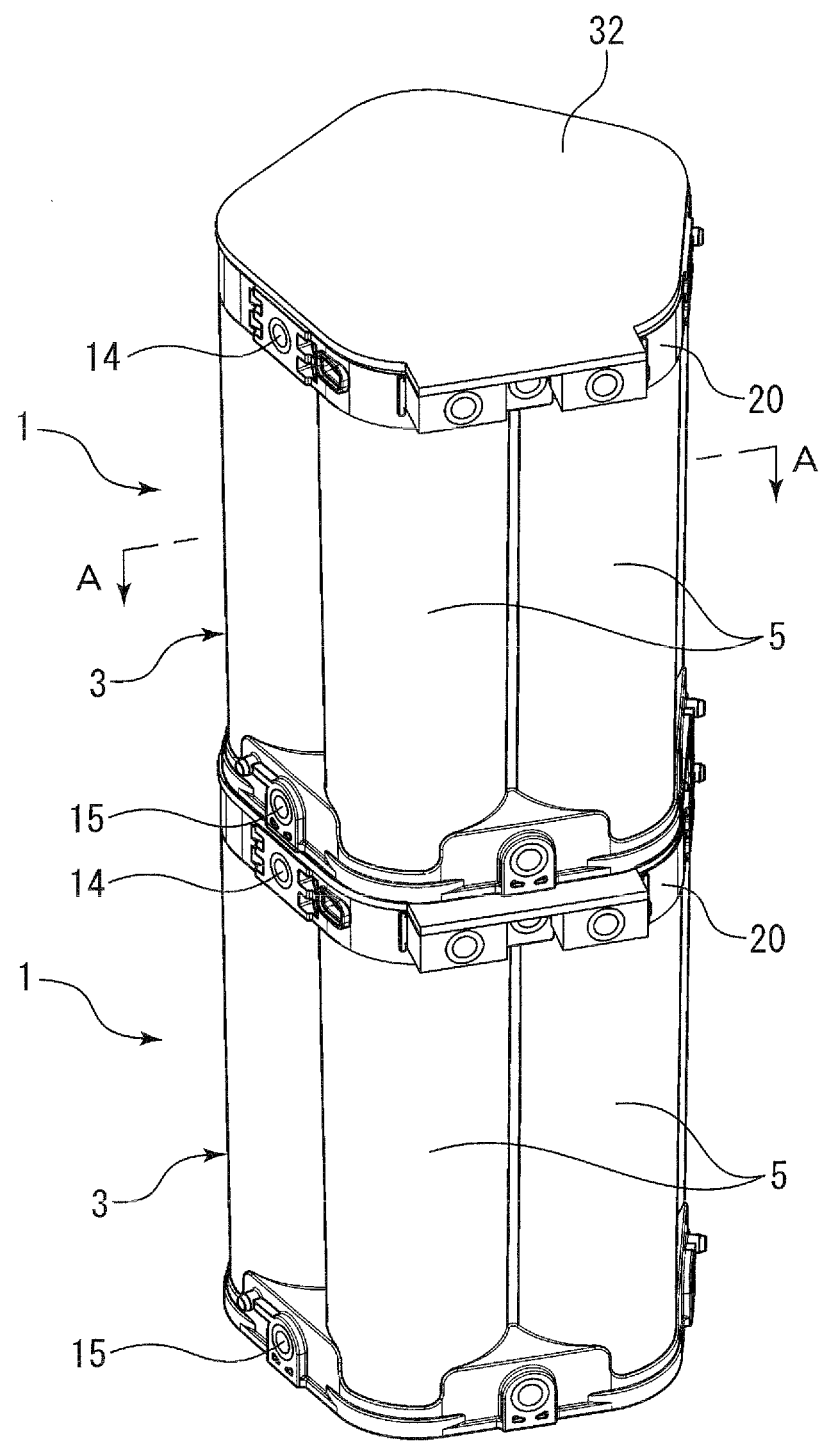
FIG. 1 is a perspective view showing two linked capacitor devices in Embodiment 1.
Figure 2:
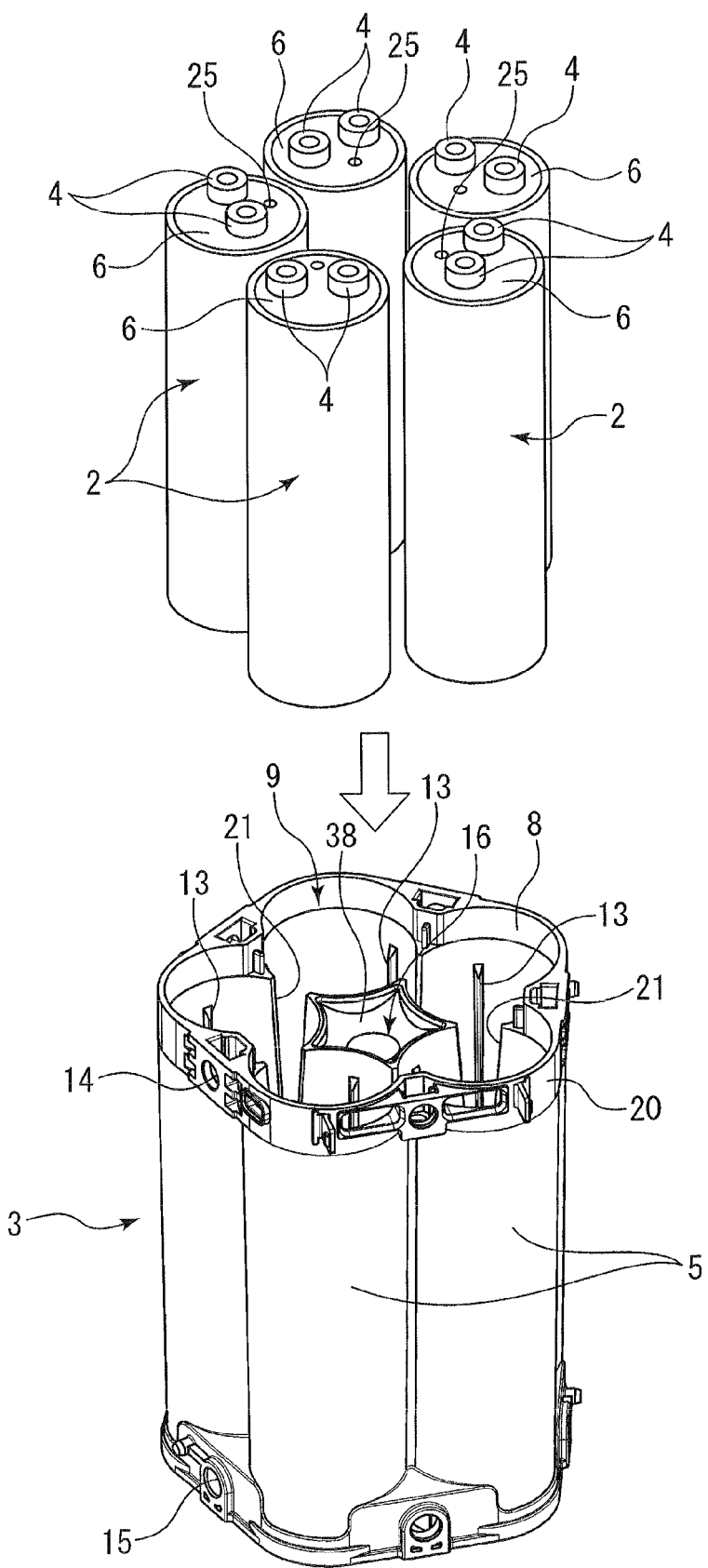
FIG. 2 is a perspective view showing the capacitor main bodies and the accommodating case.
Figure 6:
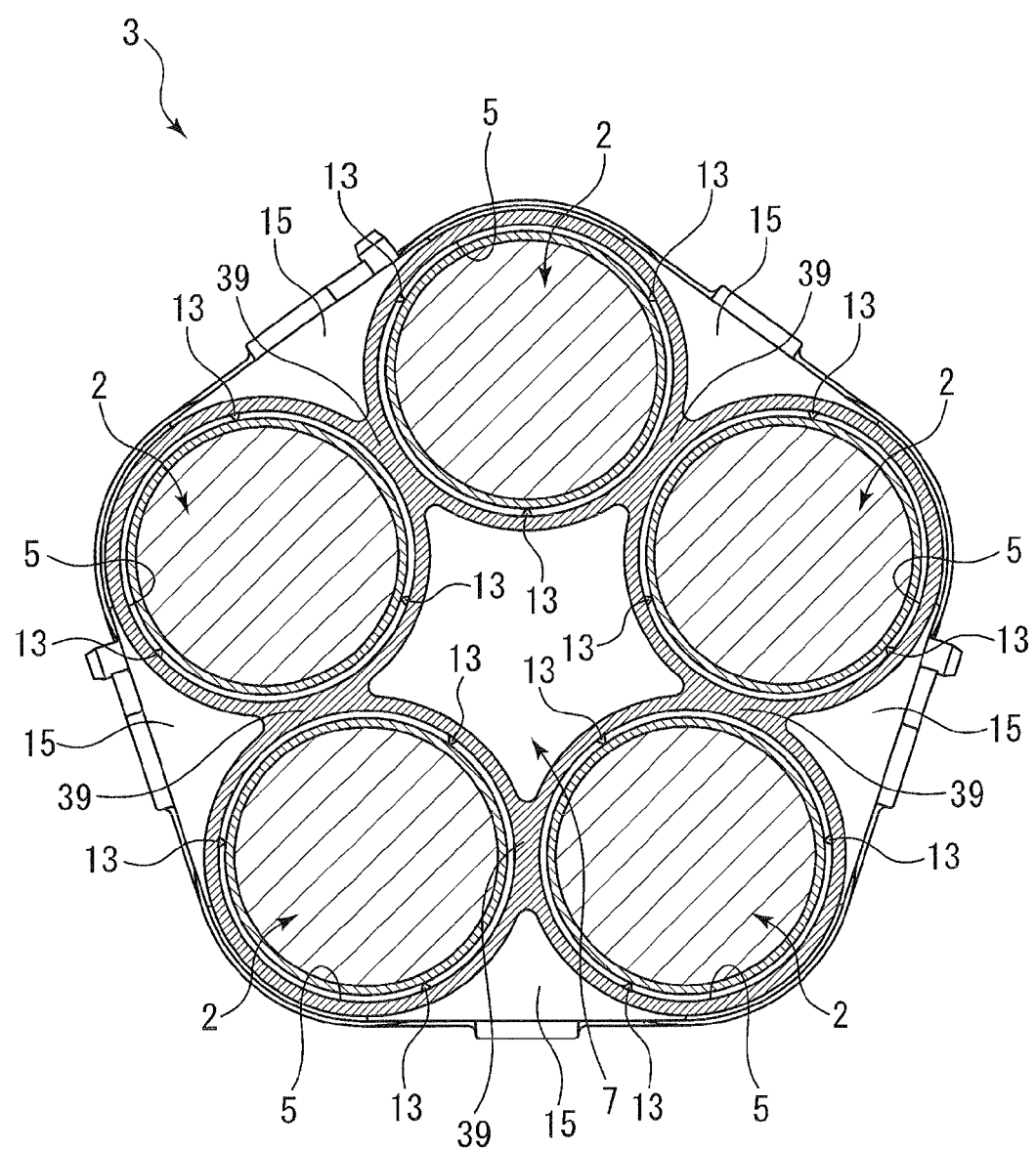
FIG. 6 is a transverse plan view along line A-A in FIG. 1, showing the accommodating case.

In one capacitor device 1, five (a plurality of) capacitor main bodies 2 are accommodated all together in an accommodating case 3, as shown in FIGS. 2 and 6. In the present embodiment, electric double-layer capacitors are used as the capacitor main bodies 2. These capacitor main bodies 2 have cylindrical shapes, and terminal parts 4 for anodes and cathodes are provided to sealing plates 6 in the top ends of the capacitor main bodies 2. Five (a plurality of) accommodating parts 5 for accommodating the capacitor main bodies 2 are provided to the accommodating case 3, the accommodating case 3 is open in the top side, and the five accommodating parts 5 are exposed to the exterior through this opening 9.

The accommodating case 3 is made of a resin and has five accommodating parts 5 molded integrally. The resin material constituting the accommodating case 3 is a thermoplastic resin, e.g., polyethylene, polypropylene, polyethylene terephthalate, polybutylene terephthalate, nylon, polyphenylene sulfide, acryl, polycarbonate, or the like. Glass fibers or the like can also be added as an additive to the various resin materials to improve the strength and heat resistance of the accommodating case 3.

The accommodating case 3 is formed from a resin mold manufactured by pouring a resin material into a mold. Therefore, accommodating cases 3 can easily be mass produced, and the capacitor devices 1 can be manufactured at low cost.

The five accommodating parts 5 of the accommodating case 3 are arranged in a circle in a plan view so that the longitudinal directions thereof all face the same direction. Furthermore, in the center of the accommodating parts 5 arranged in a circle is formed a hollow part 7 for releasing hydrogen gas produced in the capacitor main bodies 2, as described hereinafter. The accommodating parts 5 have cylindrical shapes that match the shapes and dimensions of the capacitor main bodies 2, and the accommodating parts 5 have bottomed cylindrical shapes in which one end is open and the other end is closed.

A wall part 8 extending upward is formed in the top side of the accommodating parts 5, as shown in FIG. 2. This wall part 8 is erected so as to align with the arranged shape of the five accommodating parts 5 and to enclose the outer periphery of this arranged shape. This wall part 8 enables the formation of a circuit arrangement part 20 (see FIG. 5) that enables the arrangement of components such as bus bars 18 (connecting members) for electrically connecting the terminal parts 4 of the capacitor main bodies 2 together as described hereinafter, and a circuit substrate 19 (a circuit part) provided with a balancing circuit or the like.

In the side peripheral surfaces in the top parts of the accommodating parts 5, upper nut holding parts 14 are formed for holding nuts (not shown) in which bolts (not shown) are threaded for fixing the capacitor device 1 to another member. Furthermore, lower nut holding parts 15 are formed in the side peripheral surfaces in the bottom parts of the accommodating parts 5. These upper and lower nut holding parts 14, 15 are designed to provide spaces for holding the nuts using the depressions between the accommodating parts 5.

Using the nuts (not shown) held in the upper and lower nut holding parts 14, 15 of the capacitor device 1, the capacitor device 1 can be fixed to a casing or the like of a machine (e.g. a vehicle chassis or the like). In the present embodiment, two capacitor devices 1 are arranged one on top of the other, but another possible option is to arrange the two capacitor devices 1 adjacent to each other left to right, and to use the nuts held in the upper and lower nut holding parts 14, 15 of the capacitor devices 1 to link the capacitor devices 1 together.

Figure 3:
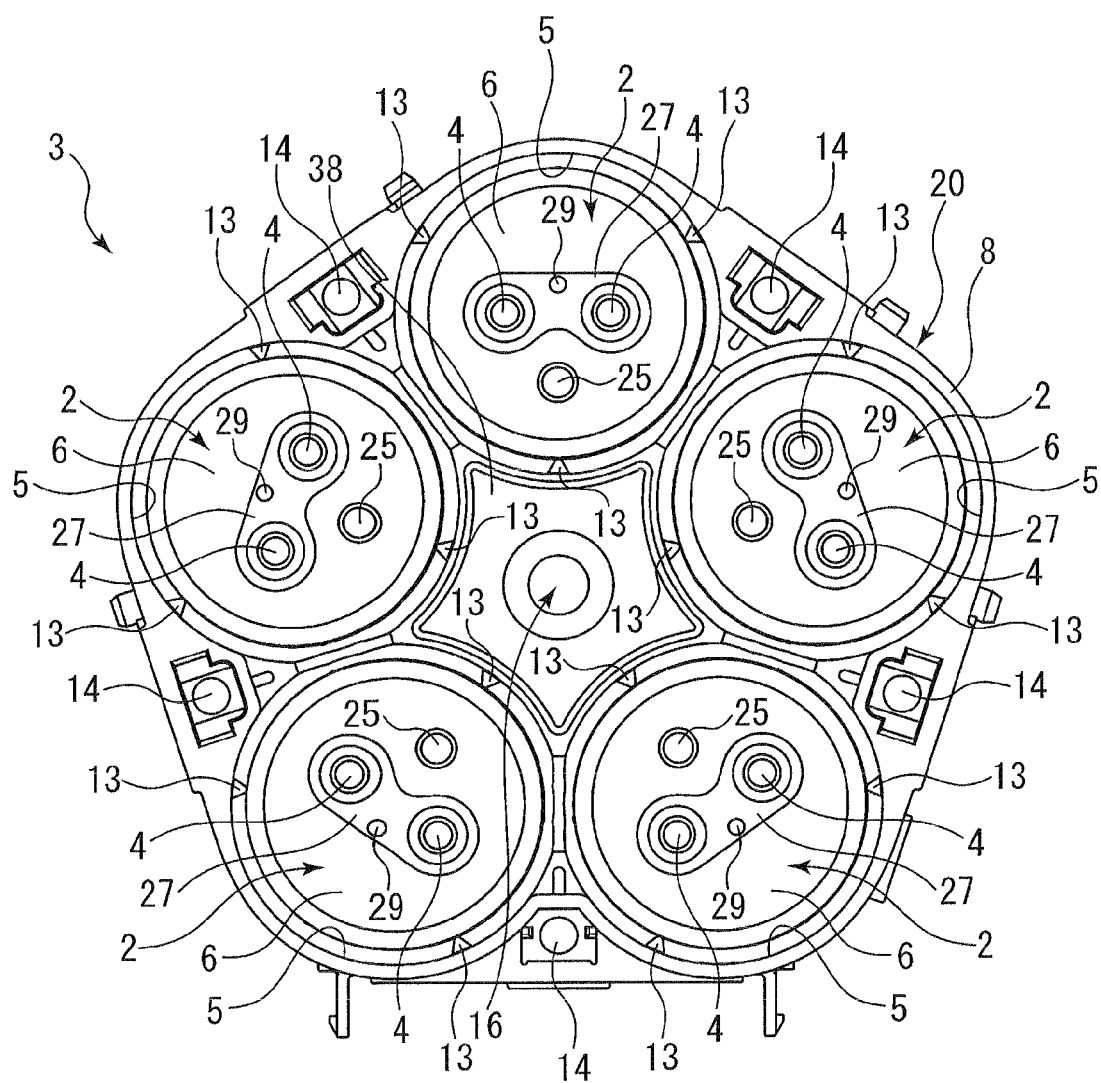
FIG. 3 is a plan view showing the capacitor main bodies as being accommodated in the accommodating case.
Figure 7:
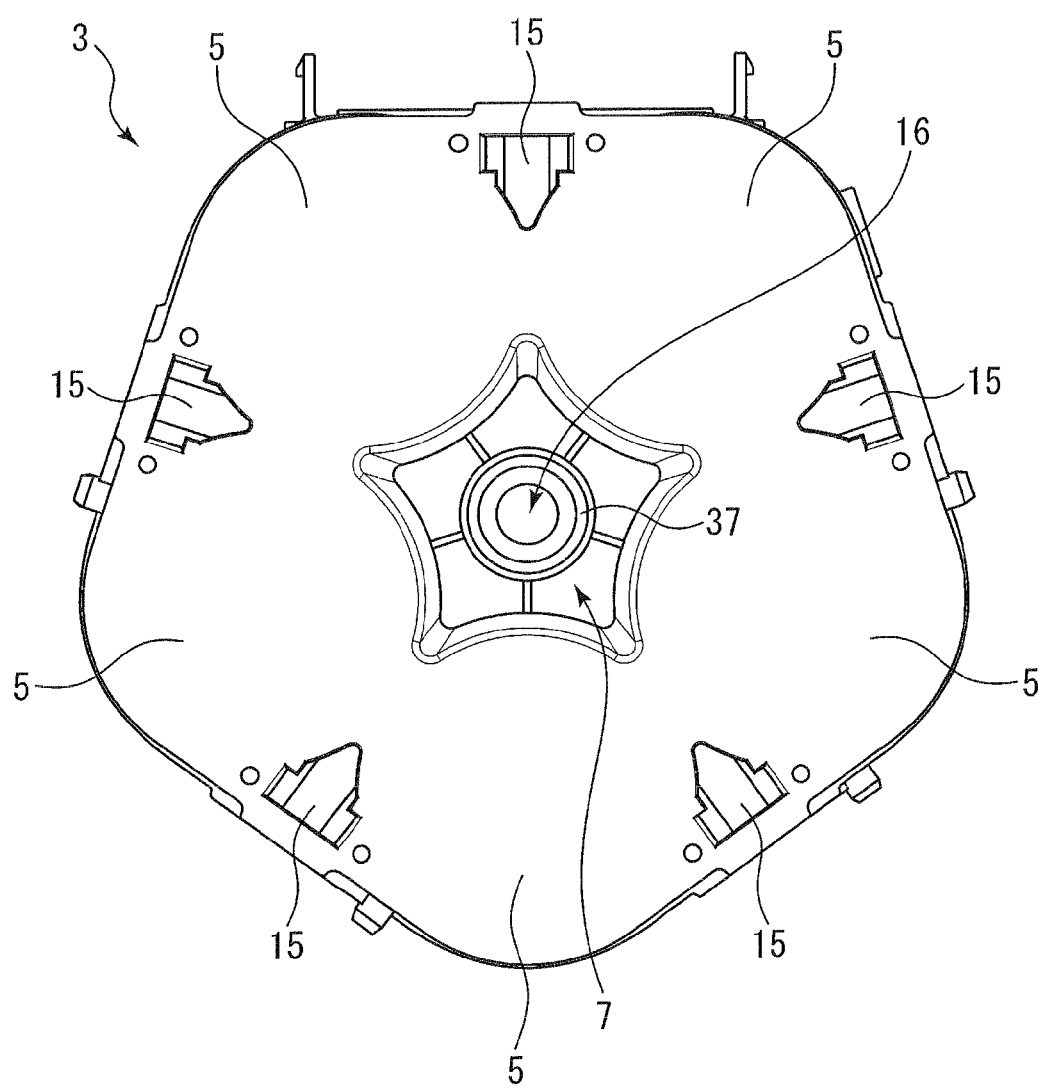
FIG. 7 is an underside view showing a capacitor device.
Figure 8:
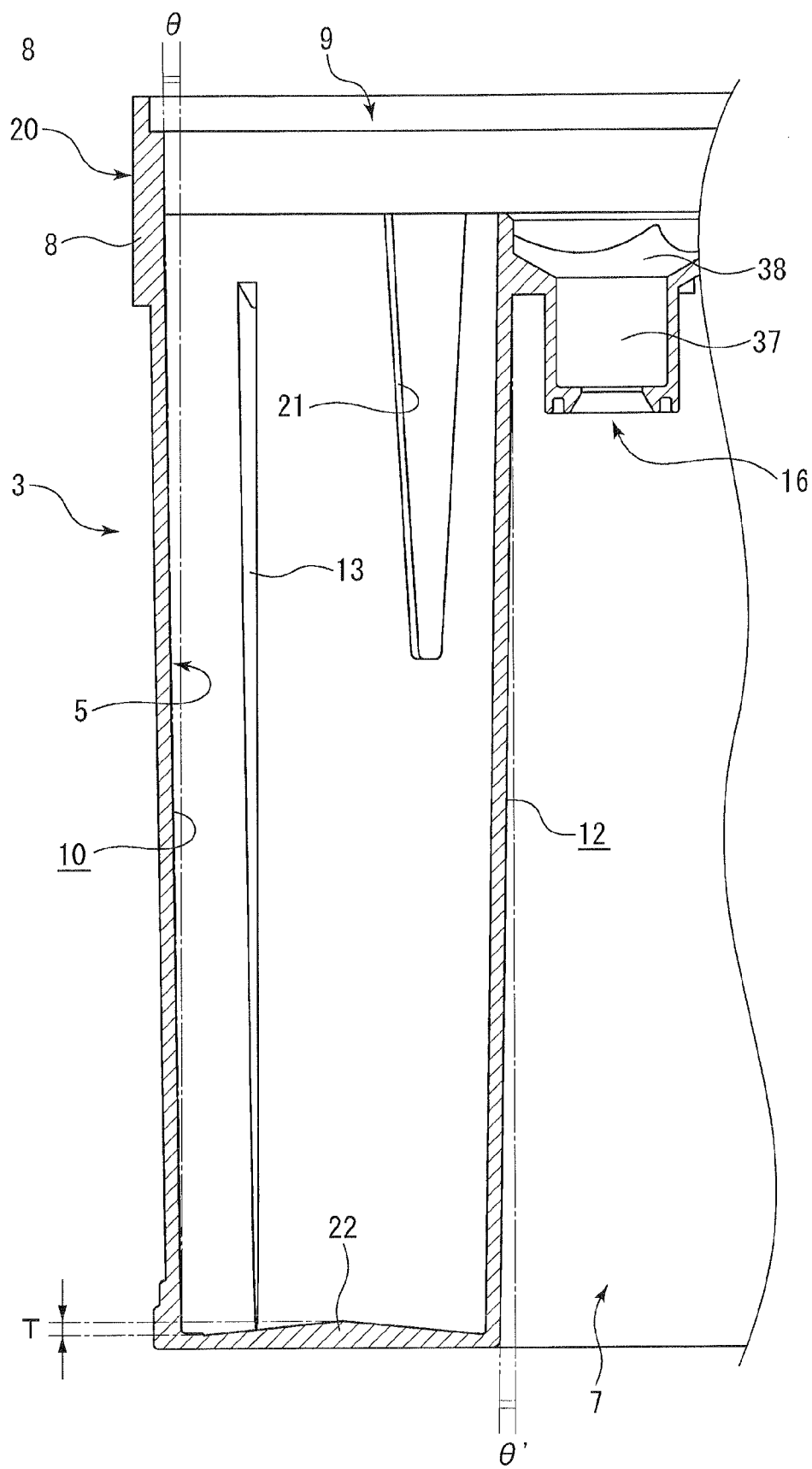
FIG. 8 is a longitudinal side view showing the accommodating case.

In the middle of the top side of the accommodating case 3 is formed a lead-out hole 16 passing through toward the hollow part 7 in the middle of the accommodating parts 5 arranged in a circle as shown in FIGS. 3, 7, and 8, and gas produced in the capacitor main bodies 2 described hereinafter is led out toward the previously described hollow part 7.

The internal peripheral surfaces of the accommodating parts 5 are tapered surfaces 10 that narrow toward the bottom as shown in FIG. 8. The incline $\theta$ of each tapered surface 10 in the present embodiment is approximately 1.0 degree. The incline $\theta$ of each tapered surface 10 may be any angle within a range of approximately 0.3 to 5.0 degrees.

Tapered surfaces 12 are also formed in the external peripheral surfaces of the accommodating parts 5, and the incline θ' of each tapered surface 12 is approximately 0.8 degrees or greater.

Figure 9:
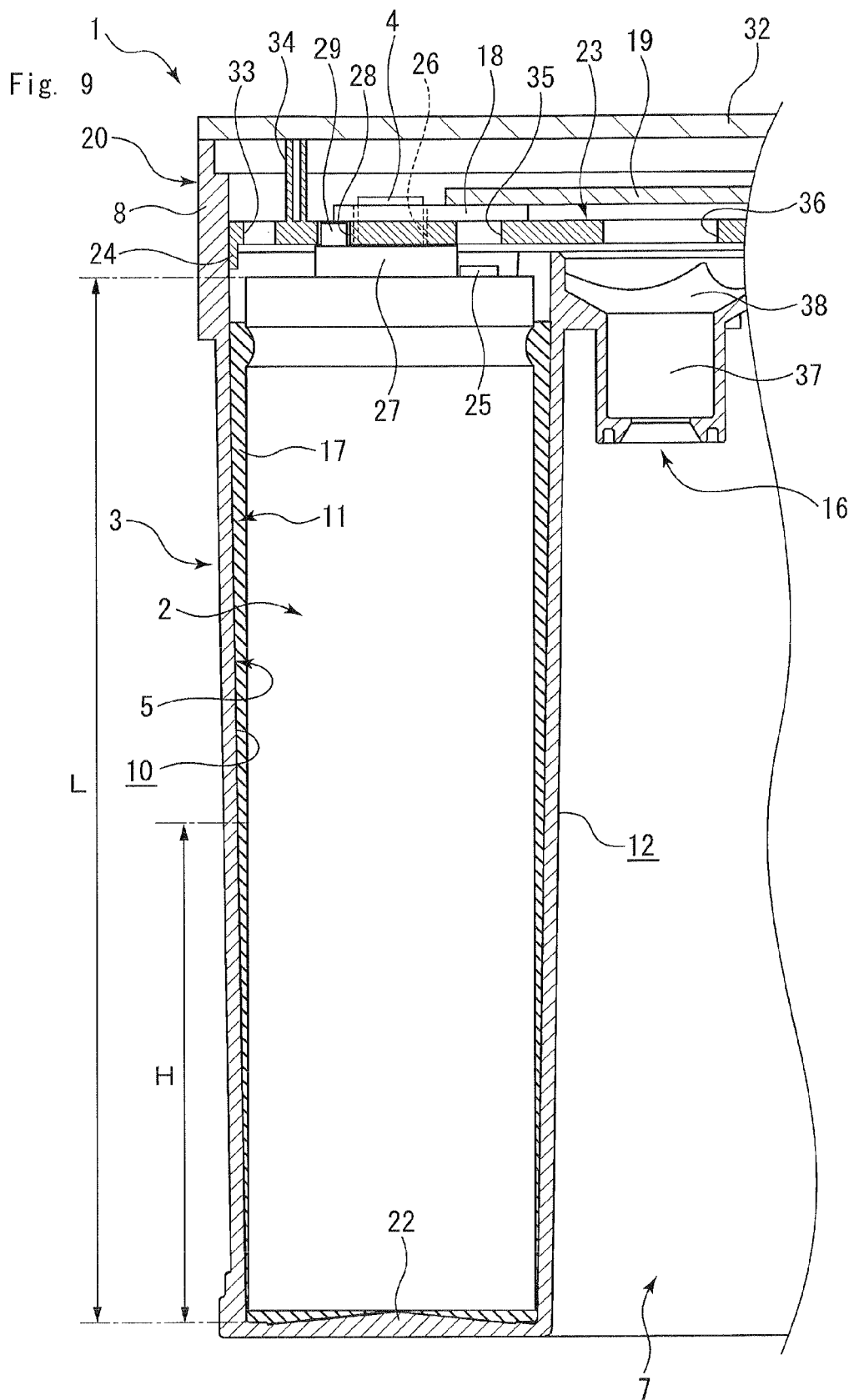
FIG. 9 is a longitudinal side view showing the accommodating case with the capacitor main bodies accommodated therein.

Furthermore, the inside diameter of each accommodating part 5 is slightly greater than the outside diameter of each capacitor main body 2 in the opening side, and is substantially equal to the outside diameter of each capacitor main body 2 in the bottom side, as shown in FIG. 9. As is described hereinafter, gaps 11 are formed between the internal peripheral surfaces of the accommodating parts 5 and the external peripheral surfaces of the capacitor main bodies 2, and these gaps 11 are filled with a resin material 17. The dimension of each gap 11 on the opening side is approximately 0.5 to 3.0 mm, taking into account the heat conduction and the filling efficiency of the resin material.

Due to the internal peripheral surfaces of the accommodating parts 5 being tapered surfaces 10 that narrow towards the bottom, the bottom sides of the capacitor main bodies 2 are positioned by the narrowing tapered surfaces 10 in the internal peripheral surfaces of the accommodating parts 5 in a manner such that the opening sides of the accommodating parts 5 are enlarged to allow the capacitor main bodies 2 to be easily fitted into the accommodating parts 5, the capacitor main bodies accommodated in the accommodating parts 5 of the accommodating case 3 can be prevented from wobbling, gaps 11 of uniform width can be formed between the internal peripheral surfaces of the accommodating parts 5 and the external peripheral surfaces of the capacitor main bodies 2, and when the gaps 11 are filled with the resin material 17, the resin material 17 can be filled uniformly without any unevenness.

In the internal peripheral surface of each of the accommodating parts 5 are formed three ribs 13 (convexities) extending vertically and protruding toward the capacitor main bodies 2, as shown in FIGS. 3 and 8. These ribs 13 are arranged uniformly in the circumferential direction of the internal peripheral surface of each accommodating part 5, and the ribs 13 protrude in a greater amount from the bottom sides of the accommodating parts 5 toward the opening sides. Furthermore, because the ribs 13 extend across the entire lengths of the accommodating parts 5 from the opening sides to the bottom sides, the ribs 13 are in contact with the external peripheral surfaces of the capacitor main bodies 2 across the entire lengths when the capacitor main bodies 2 are accommodated in the accommodating parts 5.

When each of the capacitor main bodies 2 is accommodated in an accommodating part 5, the three ribs 13 are in contact with the capacitor main bodies 2 from three directions, the capacitor main bodies 2 are held in the middle positions of the accommodating parts 5 by the ribs 13, and gaps 11 of uniform width can be formed in the circumferential direction between the internal peripheral surfaces of the accommodating parts 5 and the external peripheral surfaces of the capacitor main bodies 2. Two to six ribs 13 are preferably arranged evenly around the circumferential direction.

In the present embodiment, the ribs 13 on the internal peripheral surfaces of the accommodating parts 5 have substantially the same length as the vertical dimension of the capacitor main bodies 2. The vertical dimension of the ribs 13 may be formed spanning the entire length of the accommodating parts 5 from the openings to the bottom, or they may be formed spanning about two thirds the length of the accommodating parts 5 from the openings downward.

Linking parts 39 for linking adjacent accommodating parts 5 together are also formed in the accommodating case 3 as shown in FIG. 6. Furthermore, cutout parts 21 (communication parts), which are cut out over a predetermined length from the openings downward, are formed in the tops of the linking parts 39, as shown in FIGS. 2 and 8. Adjacent accommodating parts 5 are interconnected by these cutout parts 21.

As previously described, the internal peripheral surfaces of the accommodating parts 5 are tapered surfaces 10, and the linking parts 39 (see FIG. 6) are thinner where the top parts of the accommodating parts 5 are closer together. Therefore, it is easy to cut out and form the cutout parts 21 from the openings downward. Because the regions where the top parts of the linking parts 39 of the accommodating parts 5 become thin are easily damaged, damage to the linking parts 39 can be prevented due to these regions being cut out by the cutout parts 21, the width of the accommodating case 3 can be reduced where the accommodating parts 5 approach each other, and accommodating efficiency is improved.

Due to the cutout parts 21 being formed for communicating the accommodating parts 5 with each other, the resin material 17 filled into a predetermined accommodating part 5 moves to adjacent accommodating parts 5 via the cutout parts 21 when the accommodating parts 5 are filled with the resin material 17 as is described hereinafter, and the amount of resin material 17 filled in the accommodating parts 5 can be evenly distributed. Furthermore, after the resin material 17 hardens, the resin material 17 filled in the accommodating parts 5 becomes integrated and the strength by which the capacitor main bodies 2 are held can be improved.

In the bottom surfaces of the accommodating parts 5 are formed mound parts 22 (convexities) where the middle of the surface rises upward and protrudes in a mound shape. The bottom surfaces of the capacitor main bodies 2 come in contact with the mound parts 22 when the capacitor main bodies 2 are accommodated in the accommodating parts. In this manner, the heightwise positions of the capacitor main bodies 2 in the accommodating parts 5 can be settled by the mound parts 22 in the bottom surfaces of the accommodating parts 5.

Gaps where the resin material 17 is filled can be formed by the mound parts 22 between the bottom surfaces of the capacitor main bodies 2 and the bottom surfaces of the accommodating parts 5. These gaps are formed so that their vertical width increases outward, and when the resin material 17 is filled in, the resin material 17 can be prevented from accumulating between the bottom surfaces of the capacitor main bodies 2 and the bottom surfaces of the accommodating parts 5, and air pockets can be prevented from forming. The protruding dimension T of the mound parts 22 is approximately 0.2 to 1.0 mm.

When the capacitor device 1 is assembled as shown in FIGS. 2 and 3, the capacitor main bodies 2 are first inserted into the accommodating parts 5 from the opening 9 in the top part of the accommodating case 3. The capacitor main bodies 2 are inserted into the openings 9 side in the top parts of the accommodating cases 3 while being guided toward the centers of the accommodating parts 5 by the tapered surfaces 10 of the accommodating parts 5. When the capacitor main bodies 2 are accommodated in the accommodating parts 5, the capacitor main bodies are inserted into the accommodating parts 5 gradually with a predetermined pressure force. The bottom parts of the capacitor main bodies 2 are then positioned in predetermined positions in the accommodating parts 5 by the ribs 13. The step of accommodating the capacitor main bodies 2 in the accommodating parts 5 is the accommodation step in the present embodiment.

Furthermore, the bottom surfaces of the capacitor main bodies 2 come in contact with the mound parts 22 in the bottom surfaces of the accommodating parts 5, and the heightwise positions of the capacitor main bodies 2 are aligned. With the capacitor main bodies 2 accommodated in the accommodating parts 5, the external peripheral surfaces thereof then become covered by the accommodating parts 5. The total periphery of the plurality of the accommodating parts 5 has a uniform thickness along the external peripheral surfaces of the capacitor main bodies 2, as shown in FIG. 6.

Figure 4:
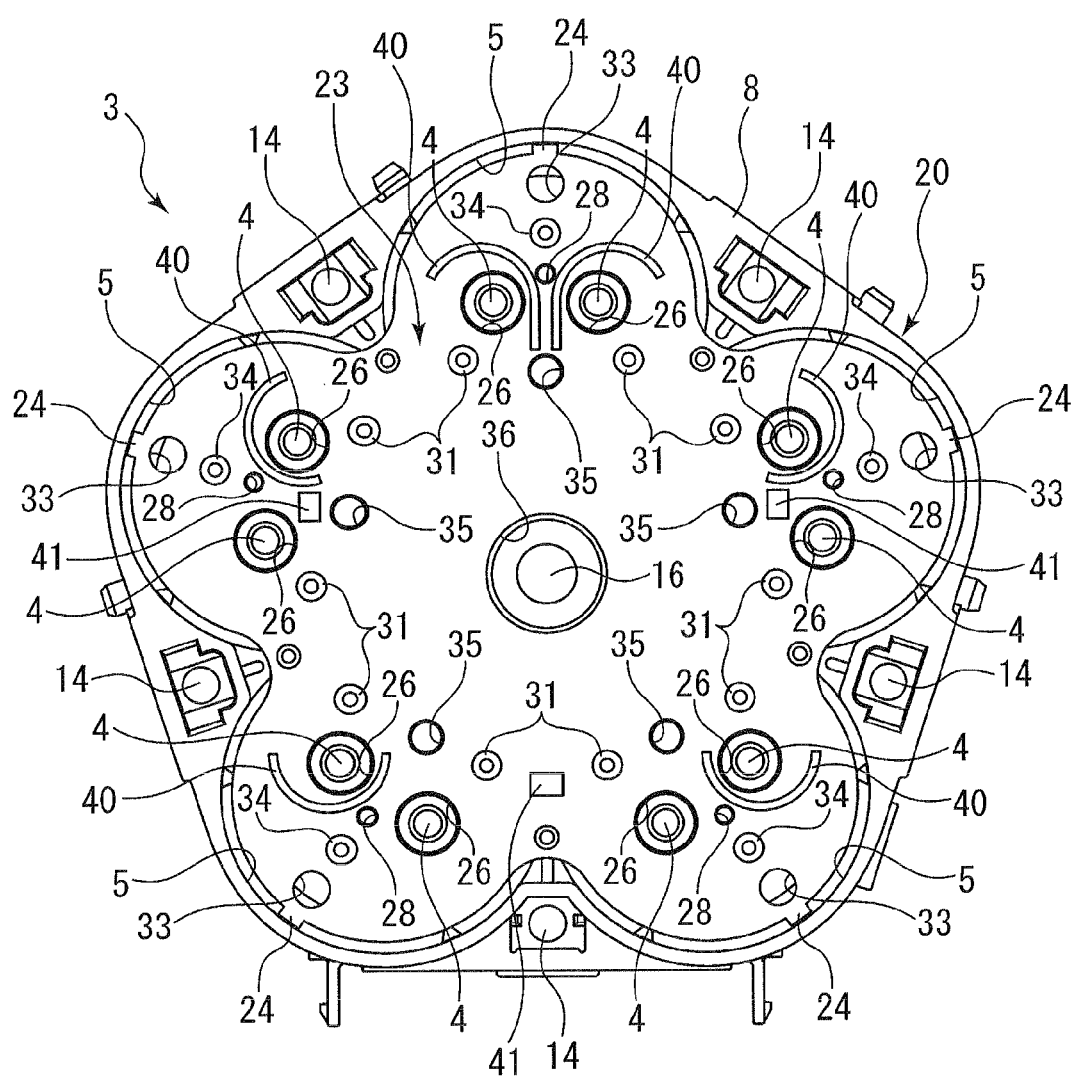
FIG. 4 is a plan view showing the center guide as being attached.
Figure 5:
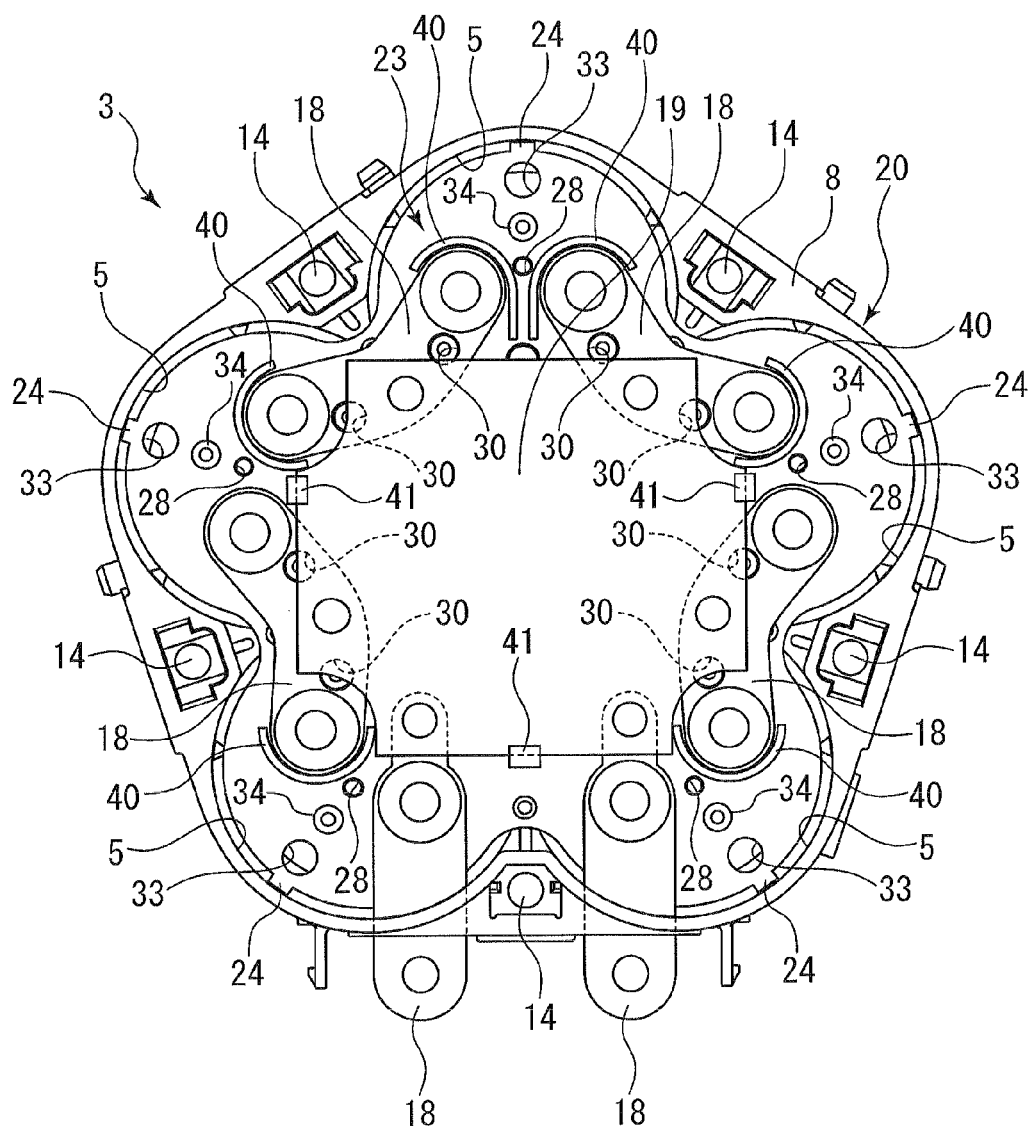
FIG. 5 is a plan view showing the bus bars and the circuit substrate as being attached.

A center guide 23 (an element member) is attached so as to cover the five capacitor main bodies 2 accommodated in the accommodating parts 5 from above, as shown in FIG. 4. The center guide 23 is a resinous plate member in which the external peripheral edge is a rough star shape which is overall substantially the same shape as the five aligned accommodating parts 5. The resin constituting the center guide 23 is the same resin as that of the accommodating case 3 previously described.

In the present embodiment, the center guide 23 is attached to the capacitor main bodies 2 after the capacitor main bodies 2 are accommodated in the accommodating parts 5, but the capacitor main bodies 2 may also be accommodated in the accommodating parts 5 after the center guide 23 is attached to the capacitor main bodies 2.

Curved pieces 24 (positioning means) that curve downward are formed in the edge edges of the center guide 23 as shown in FIG. 9, and these curved pieces 24 come in contact with the internal peripheral surface of the accommodating case 3, positioning the center guide 23. Furthermore, insertion holes 26 through which the terminal parts 4 of the capacitor main bodies 2 are inserted are formed in the center guide 23. The internal peripheral surfaces of the curved pieces 24 of the center guide 23 maybe brought in contact with the external peripheries of the capacitor main bodies 2 to align the positions of the center guide 23 and the capacitor main bodies 2.

Figure 10:
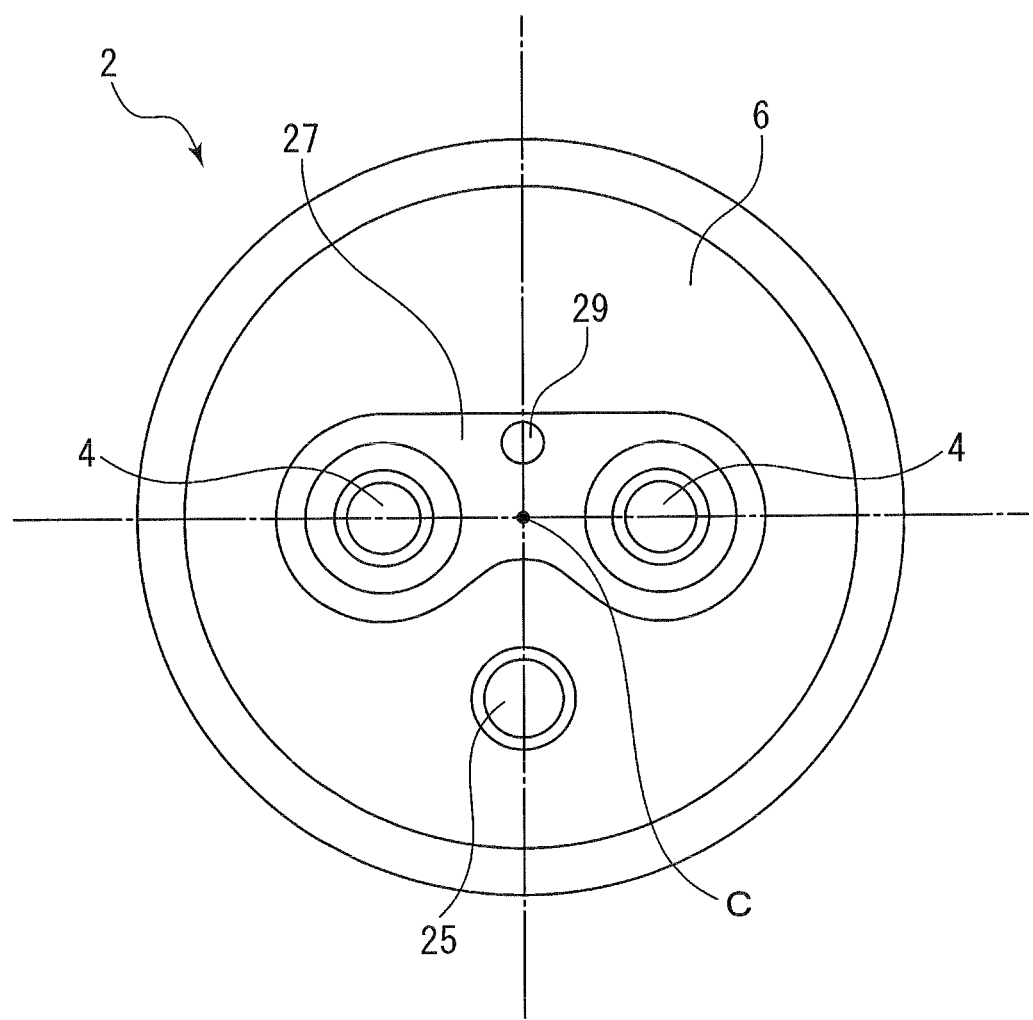
FIG. 10 is a plan view showing the terminal parts of a capacitor main body.

A terminal base 27 for arranging the terminal parts 4 is provided protruding in the sealing plate 6 of each capacitor main body 2 as shown in FIG. 10. The terminal parts 4 for an anode and a cathode are arranged on this terminal base 27, and between the terminal parts 4 protrudes an engaging convexity 29 (an engaging part) which engages with an engaged hole 28 (an engaged part) of the center guide 23. Each engaging convexity 29 is provided in a position slightly outside of the center C of the sealing plate 6, i.e., the longitudinal axis C of the capacitor main body 2.

When the center guide 23 is attached to the capacitor main bodies 2 as shown in FIG. 4, it is possible to specify the orientation of the capacitor main bodies 2 whereby the engaging convexities 29 can engage with the engaged holes 28 in a manner such that the terminal parts 4 are inserted through the insertion holes 26 of the center guide 23. Specifically, the engaging convexities 29 allow the capacitor main bodies 2 to have non-rotational symmetry with the longitudinal axes as centers C (see FIG. 10), and the capacitor main bodies 2 can be prevented from being attached with the anode terminal parts 4 and the cathode terminal parts 4 reversed.

The top surfaces of the terminal bases 27 of the sealing plates 6 of the capacitor main bodies 2 come in contact with the bottom surface of the center guide 23, and the heightwise positions of the capacitor main bodies 2 are unified. Downward protruding convexities (not shown) may also be provided in the bottom surface of the center guide 23, and the heightwise positions of the capacitor main bodies 2 may be unified by bringing these convexities in contact with the top surfaces of the sealing plates 6.

When the center guide 23 is attached to the capacitor main bodies 2, the five capacitor main bodies 2 are integrated together and the positions of the capacitor main bodies 2 relative to each other are established. Doing so enables the engaging convexities 29 of the capacitor main bodies 2 to engage in the engaged holes 28 of the center guide 23, the capacitor main bodies 2 to be accommodated in the accommodating parts 5 while positioned by the center guide 23, the terminal parts 4 to be arranged in a pre-established specified manner, and the positions of the terminal parts 4 of the capacitor main bodies 2 to be easily aligned by the center guide 23.

The terminal parts 4 of the capacitor main bodies 2 protrude upward from the insertion holes 26 of the center guide 23, the bus bars 18 (connection members) are connected to the terminal parts 4, and the capacitor main bodies 2 are electrically connected in series. The terminal parts 4 and the bus bars 18 are connected using screw connections, laser connections, ultrasonic connections, or the like.

The circuit substrate 19 is also attached, which is provided with balancing circuits or the like arranged between the bus bars 18. Protruding in the top surface of the center guide 23 are protruding rods 31 (engaged parts) which are engaged in holes 30 formed in the bus bars 18 or engaging holes (not shown) in the bottom surface of the circuit substrate 19, and the bus bars 18 and the circuit substrate 19 are positioned by these protruding rods 31.

In the top surface of the center guide 23, bus bar engaging convexities 40 (engaged parts) protrude in which the bus bars 18 engage along the edges (engaging parts), and hook-shaped interlocking pawls 41 (engaged parts) that interlock with the edges (engaging parts) of the circuit substrate 19 are provided as well. The bus bars 18 and the circuit substrate 19 are positioned by these bus bar engaging convexities 40 and interlocking pawls 41. The center guide 23, the bus bars 18, and the circuit substrate 19 are integrated, improving vibration resistance. The balancing circuits of the circuit substrate 19 are designed to be connected with each of the bus bars 18.

Because the positions of the capacitor main bodies 2 relative to each other are established as previously described, the bus bars 18, the circuit substrate 19, and the like can easily be connected to the terminal parts 4 of the capacitor main bodies 2, and the work of manufacturing the capacitor device 1 can be simplified. The circuit substrate 19 is also coated on the surface with an epoxy resin, a urethane resin, or the like, preventing corrosion. This can also make it easier to fix members such as the bus bars 18 and circuit substrate 19 in place, and this is particularly effective when the capacitor device 1 is used for an application in a vehicle which is subject to vibration.

The insertion holes 26 of the center guide 23 can also be used as engaged parts, the terminal parts 4 of the capacitor main bodies 2 can also be used as the previously described engaging parts, the bus bars 18 are used to electrically connect the terminal parts 4 of the capacitor main bodies 2, the capacitor main bodies 2 are all connected together by the center guide 23 and the bus bars 18, the capacitor main bodies 2 are easily accommodated in the accommodating parts 5, and the work of manufacturing the capacitor device 1 can be simplified. The step of attaching the center guide 23 to the capacitor main bodies 2 is the integration step in the present embodiment.

The gaps 11 formed between the internal peripheral surfaces of the accommodating parts 5 and the external peripheral surfaces of the capacitor main bodies 2 are filled with the fluid resin material 17 as shown in FIG. 9. Fill holes 33 used to fill in the resin material 17 are also formed in the center guide 23, and filling pipes (not shown) or the like are inserted through these fill holes 33 into the gaps 11 to fill in the resin material 17. The resin material 17 is a thermoplastic resin, such as an epoxy resin or a urethane resin, which is hardened by heating or by causing a polymerization reaction with a mixture of two liquids.

The entire length L of each gap 11 between the external peripheral surfaces of the capacitor main bodies 2 and the internal peripheral surfaces of the accommodating parts 5 is filled with the resin material 17. In the present embodiment, the entire length L of each gap 11 is filled with the resin material 17, but another option is to fill a half-length H of each gap 11 with the resin material 17, and a different amount of resin material 17 can be used as appropriate.

With the gaps 11 of the accommodating parts 5 filled with the resin material 17, the accommodating case 3 is heated to carry out a resin hardening step of hardening the resin material 17. The heating of this resin hardening step is performed at a temperature of 200 degrees or less for five minutes or less, so that the heat on the capacitor main bodies 2 is not excessive and there is no characteristic deterioration or the like.

Thus, the strength of holding the capacitor main bodies 2 is improved by hardening the resin material 17, corrosion of the capacitor main bodies 2 can be prevented, and in the integration step, the capacitor main bodies 2 can be engaged all together with the predetermined center guide 23 and the terminal parts 4 of the capacitor main bodies 2 can be positioned relative to each other by the center guide 23. In the subsequent resin hardening step, because the resin material 17 is hardened between the internal peripheral surfaces of the accommodating parts 5 and the external peripheral surfaces of the capacitor main bodies 2, there is no strain or stress in the terminal parts 4 of the capacitor main bodies 2 even through the terminal parts 4 are connected to components such as the bus bars 18 and the circuit substrate 19, and a capacitor device 1 can be manufactured which withstands use over many years. In other words, it is preferable to harden the resin material after the step of causing stress to the terminal parts 4 and other components.

The external peripheral surfaces of the capacitor main bodies 2 are bonded with the internal peripheral surfaces of the accommodating parts 5 via the resin material 17, the capacitor main bodies 2 are firmly held within the accommodating parts 5, and heat conduction to the accommodating case 3 is improved through the resin material 17. Furthermore, heat is radiated better, and external impact force on the capacitor main bodies 2 is softened by the resin material 17.

Because the terminal parts 4 of the capacitor main bodies 2 are electrically connected to electric circuits or the like in the previously described integration step, and the resin material 17 is then hardened between the internal peripheral surfaces of the accommodating parts 5 and the external peripheral surfaces of the capacitor main bodies 2 in the resin hardening step, there is no strain or stress in the terminal parts 4, and it is possible to manufacture a capacitor device 1 which withstands use over many years.

Due to a thermosetting resin that undergoes a polymerization reaction from heating or the like being used as the resin material 17 filled in the accommodating parts 5, the work can be performed while controlling the hardening state of the resin material 17, and when the resin material 17 is fluid, the terminal parts 4 of the capacitor main bodies 2 can be positioned relative to each other, the capacitor main bodies can be inserted into the accommodating parts 5, and the capacitor device 1 can be manufactured easily.

The resin constituting the accommodating case 3 is a resin that has affinity for the resin material 17 filled in the accommodating parts 5, and when the resin material 17 is hardened in the resin hardening step, the resin material 17 and the accommodating parts 5 of the resinous accommodating case 3 are firmly bonded together, and the strength of holding the capacitor main bodies 2 can be improved.

In the present embodiment, the accommodating parts 5 are filled with the resin material 17 after the capacitor main bodies 2 have been accommodated in the accommodating parts 5, but other alternatives may be used. For example, the gaps 11 may be filled with the resin material 17 by first pouring all of the resin material 17 into the accommodating parts 5 and then pushing apart the resin material 17 to accommodate the capacitor main bodies 2 in the accommodating parts 5.

Another option is to first pour half of the resin material 17 into the accommodating parts 5, then push the resin material 17 apart to accommodate the capacitor main bodies 2 in the accommodating parts 5, and then pour the rest of the resin material 17 into the accommodating parts 5 and fill the gaps 11 with the resin material 17.

Furthermore, in the present embodiment, the integration step of attaching the center guide 23 to the capacitor main bodies 2 is carried out before the accommodating parts 5 are filled with the resin material 17, but the integration step of attaching the center guide 23 to the capacitor main bodies 2 may also be carried out after the accommodating parts 5 are filled with the resin material 17. In this case, the timing at which the resin material 17 is hardened is preferably after the integration step.

In the present embodiment, the resin material 17 is hardened by heating, and this heating step is the resin hardening step. However, when a resin material 17 is used which has hardened after a predetermined amount of time following the mixing of two liquids, for example, the step of waiting for a predetermined amount of time until the filled resin material 17 hardens is the resin hardening step.

The opening 9 of the accommodating case 3 is closed up by a closing plate 32. The top surface side of the center guide 23 is provided with a protruding rod 34 which protrudes upward and comes in contact with the bottom surface of the closing plate 32 to align the position of the closing plate 32. With the position of the closing plate 32 specified by the protruding rod 34, the peripheral edge of the closing plate 32 and the wall part 8 of the accommodating case 3 are sealed together by means such as ultrasonic welding.

In some cases, leakage current flows into the capacitor main bodies 2 during use, and hydrogen gas is produced by this leakage current. A pressure release mechanism 25 (pressure release means) for releasing the pressure of the hydrogen gas produced in the capacitor main bodies 2 is provided to the top surface of each sealing plate 6 of each capacitor main body 2, as shown in FIG. 10. With the capacitor main bodies 2 accommodated in the accommodating parts 5, the pressure release mechanisms 25 are disposed in the sides near the center of the accommodating case 3 (see FIG. 3).

Release holes 35 are formed in the center guide 23 in positions corresponding to the pressure release mechanisms 25, as shown in FIGS. 4 and 9. Therefore, the gas released from the pressure release mechanisms 25 is not stopped by the center guide 23, and the gas can be released safely from the release holes 35.

The gas released from the pressure release mechanisms 25 of the capacitor main bodies 2 flows from the release holes 35 to the top surface of the center guide 23. A through hole 36 for gas to pass through is formed in the middle of the center guide 23 in a position corresponding to the lead-out hole 16 of the accommodating case 3 previously described, and gas that has flowed to the top surface of the center guide 23 is led to the lead-out hole 16 of the accommodating case 3.

The lead-out hole 16 is provided to a position enclosed by the circularly arranged accommodating parts 5, as shown in FIGS. 7 and 9. The lead-out hole 16 also has a cylindrical part 37 which is cylindrical in shape and which protrudes toward the hollow part 7 underneath. Furthermore, above the cylindrical part 37 is provided a funnel part 38, which is funnel-shaped and inclined toward the cylindrical part 37. Water that has seeped in is easily drained by this funnel-shaped funnel part 38.

When gas is produced in the capacitor main bodies 2 and the pressure release mechanisms 25 activate, the gas is led out from the lead-out hole 16 in the middle of the accommodating case 3 to the hollow part 7. Furthermore, the underside of the hollow part 7 is open to the exterior, and the gas is expelled out of the accommodating case 3 from the hollow part 7.

Thus, the lead-out hole 16, which leads gas released from the pressure release mechanisms 25 of the capacitor main bodies 2 out of the accommodating case 3, is enclosed by the integrally linked plurality of accommodating parts 5, the lead-out hole 16 is disposed on the inner side of the hollow part 7 (the top side of the accommodating case 3) formed by the plurality of accommodating parts 5, the lead-out hole 16 stays unexposed to the exterior of the accommodating case 3, and external dust and water can be prevented from entering the accommodating case 3 through the lead-out hole 16.

At least the hollow part 7 side of the accommodating parts 5 has a uniform thickness along the external peripheral surfaces of the capacitor main bodies 2 as shown in FIG. 6. Therefore, the plurality of accommodating parts 5 can be arranged near each other, the accommodating case 3 can be reduced in size and weight, a hollow part 7 of sufficient capacity can be formed where gas led out from the lead-out hole 16 expands, and the gas can be released safely from the lead-out hole 16.

Due to the plurality of accommodating parts 5 being arranged in a circle and the lead-out hole 16 being provided in the middle of the plurality of accommodating parts 5, there is the same distance to the lead-out hole 16 from each pressure release mechanism 25 of the capacitor main bodies 2 accommodated in the accommodating parts 5, and when the gas is released from a pressure release mechanism 25 of any capacitor main body 2, the released gas can reach the lead-out hole 16. The gas that has passed through the lead-out hole 16 passes through a gap (not shown) formed between the vertically connected capacitor devices 1, and the gas is released to the exterior from the capacitor devices 1.

Due to the accommodating case 3 being made of a resin in which the plurality of accommodating parts 5 are molded together, the interior of the accommodating case 3 is closed up to a greater degree, and external dust and water can be prevented from entering the accommodating case through some way other than the lead-out hole.

Because the opening side of the accommodating case 3 is sealed by the closing plate 32 and only the lead-out hole 16 in the middle of the accommodating case 3 is open, when the capacitor device 1 is installed in a machine such as a vehicle, water will not seep into the capacitor device 1 even in conditions such that the vehicle is submerged, as long as the water does not reach past the lead-out hole 16 of the accommodating case 3.

Embodiment 2

Next, a capacitor device according to Embodiment 2 is described with reference to FIGS. 11 to 14. The same symbols are used to denote the same structural components as those of the previous embodiment, and redundant descriptions are omitted. In Embodiment 2, only an accommodating case 50 and a center guide 51 (an element member) are configured differently from the previous Embodiment 1, and descriptions of other members are omitted.

Figure 11:
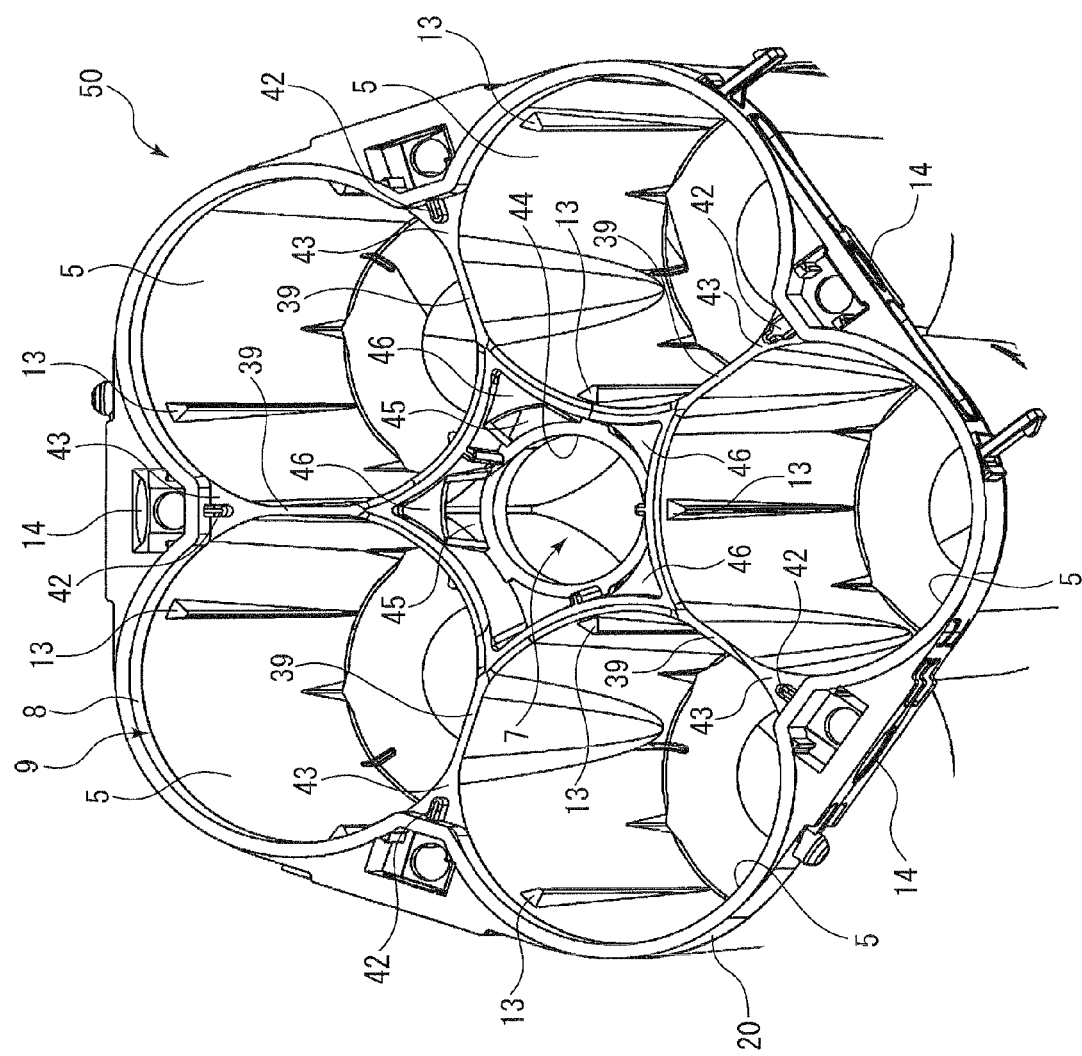
FIG. 11 is a perspective view showing the accommodating case of Embodiment 2.

In the previous Embodiment 1, cutout parts 21 were formed in the top of the linking parts 39 for linking the accommodating parts 5 of the accommodating case 3 together, but cutout parts 21 are not formed in the linking parts 39 for linking the accommodating parts 5 of the accommodating case 50 together in Embodiment 2 as shown in FIG. 11, and the linking parts 39 extend across the entire vertical length of the accommodating parts 5. In the corners formed by the top ends of the linking parts 39 and the wall part 8, case convexities 42 (interlocked parts) are formed extending upward and toward the center of the accommodating case 50. One case convexity 42 is provided between each pair of adjacent accommodating parts 5. The top ends of the linking parts 39 around the case convexities 42 function as contact surfaces 43 where the bottom surface (underside) of the center guide 51 comes in contact.

In the middle of the top side of the accommodating case 50 is formed a cylindrical hole 44 having a substantially cylindrical shape and opening into the hollow part 7 in the middle of the circularly arranged accommodating parts 5. A predetermined circuit device, such as a thermostat (not shown), can be placed in this cylindrical hole 44. In the periphery of the cylindrical hole 44 are formed five (a plurality of) lead-out holes 45 for leading gas produced in the capacitor main bodies 2 out to the previously described hollow part 7. The lead-out holes 45 are formed so as to constitute a substantially triangular shape in the depressions enclosed by the accommodating parts 5. Furthermore, above the appropriate four lead-out holes 45 from among the five lead-out holes 45, ridges 46 (fixing base parts) are formed spanning so as to constitute a substantially triangular shape in the depressions between adjacent accommodating parts 5.

Figure 12:
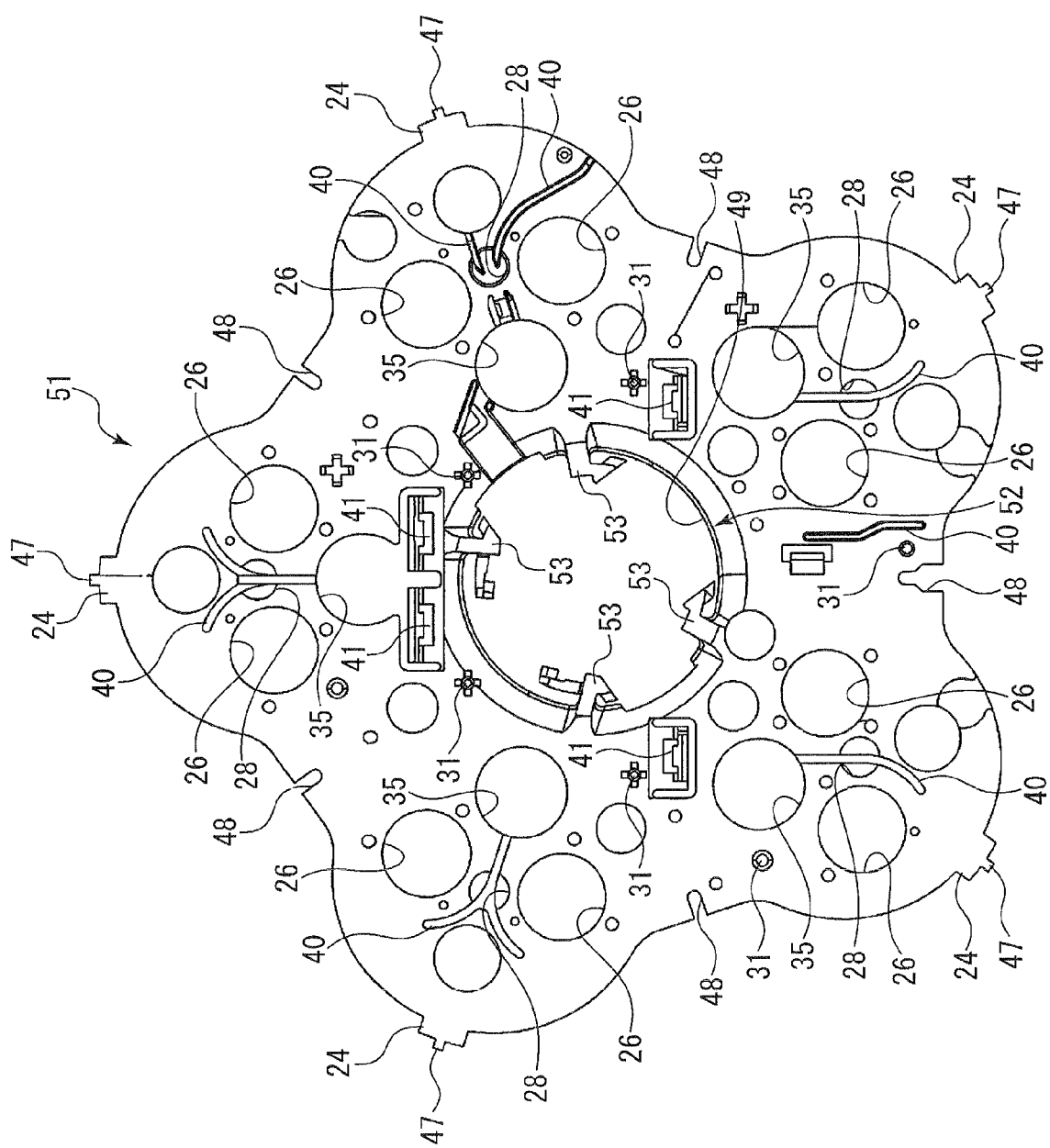
FIG. 12 is a plan view showing the center guide.
Figure 13:
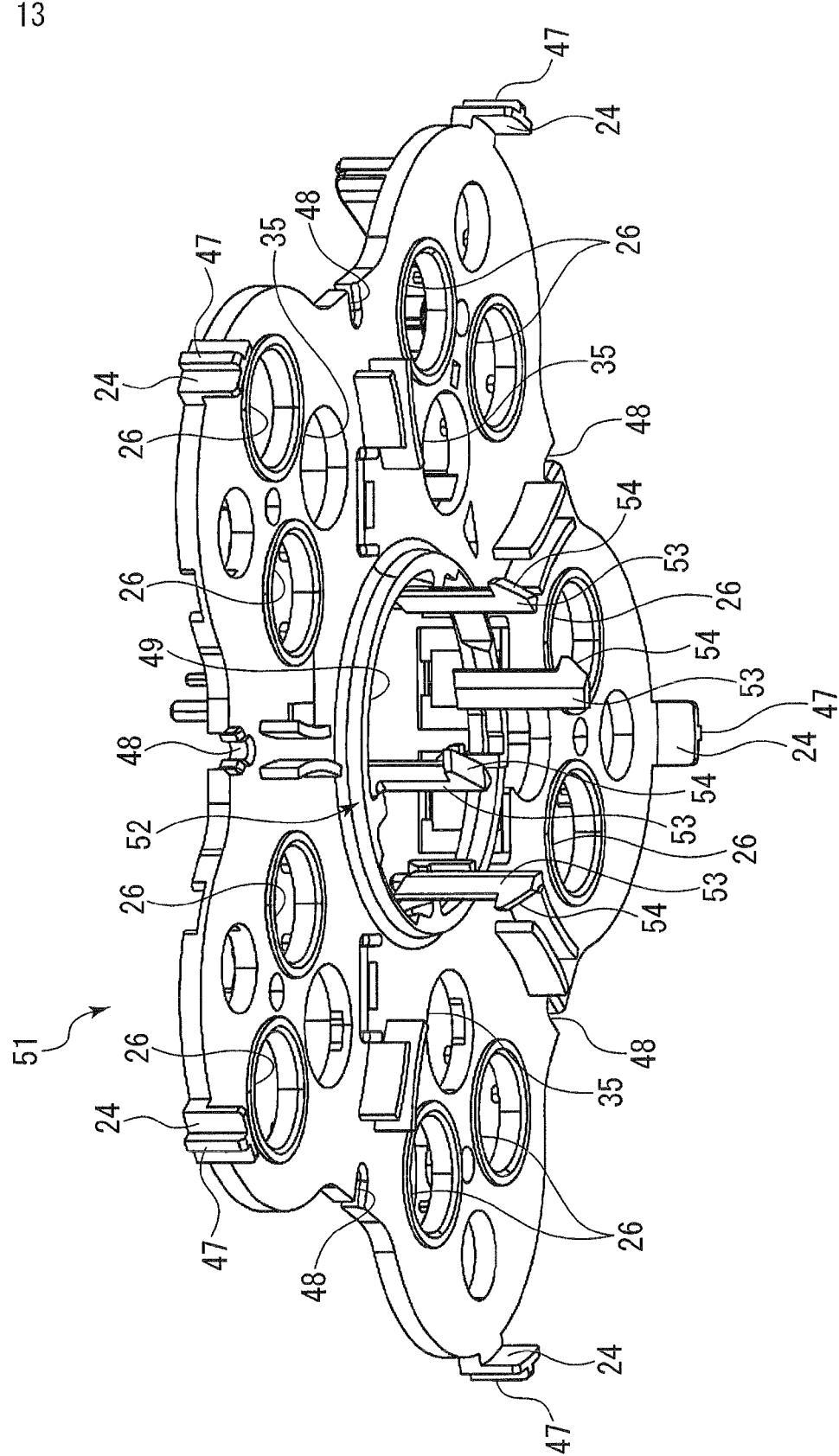
FIG. 13 is a perspective view showing the center guide as seen from the bottom surface.

In the edge sides of the center guide 51, curved pieces 24 which curve downward are formed in the end edges of the regions that bulge outward as shown in FIGS. 12 and 13. Convex protrusions 47 extend in the vertical direction in the external surfaces of the curved pieces 24, and the protrusions 47 come in contact with the internal peripheral surfaces of the wall parts 8 of the accommodating parts 5, positioning the center guide 51 in the diameter direction relative to the accommodating case 50.

In the regions in the edges of the center guide 51 where there are depressions between the outward bulging regions, guide concavities 48 (interlocking parts) hollowed into substantial U shapes are provided, forming pairs with the previously described case convexities 42 of the accommodating case 50. These guide concavities 48 are designed to interlock with the case convexities 42 of the accommodating case 50 when the center guide 51 is accommodated in the accommodating case 50 (see FIG. 14). The guide concavities 48 of the center guide 51 are guided up and down along the case convexities 42 of the accommodating case 50.

With the guide concavities 48 of the center guide 51 thus engaged with the case convexities 42 of the accommodating case 50, the center guide 51 is positioned relative to the accommodating case 50. Because the center guide 51 is positioned relative to the accommodating case 50 as previously described by the case convexities 42 of the accommodating case 50 and the guide concavities 48 of the center guide 51, the center guide 51 is easily attached to the accommodating case 50, and the work of manufacturing the capacitor device 1 can be simplified.

Similar to Embodiment 1 previously described, protruding in the top surface of the center guide 51 are protruding rods 31 which engage with the holes 30 formed in the bus bars 18 or with engaging holes (not shown) in the bottom surface of the circuit substrate 19. Also provided in the top surface of the center guide 51 are hook-shaped interlocking pawls 41 which interlock with the edges of the circuit substrate 19, and in which bus bar engaging convexities 40 protrude that engage with the bus bars 18 along the edges. The bus bars 18 and the circuit substrate 19 are positioned by the protruding rods 31, the bus bar engaging convexities 40, and the interlocking pawls 41.

The center guide 51 is circular in shape as seen in plan view, and in the middle of the center guide 51, a middle hole 49 is formed in a position corresponding to the cylindrical hole 44 of the accommodating case 50 as shown in FIG. 12. This middle hole 49 is designed to lead gas flowing to the top surface of the center guide 51 to the lead-out holes 45 of the accommodating case 50, similar to the through hole 36 of the previous Embodiment 1. This middle hole 49 is formed in the center guide 51 in a position enclosed by the plurality of insertion holes 26 and engaged holes 28 (engaged parts), and when the capacitor main bodies 2 and bus bars 18 are attached to the center guide 51, the capacitor main bodies 2 and bus bars 18 are arranged surrounding the middle hole 49.

The internal peripheral edge of the middle hole 49 of the center guide 51 is bent downward, forming a bent edge 52 as shown in FIG. 13. The strength of the center guide 51 is increased by this bent edge 52.

Furthermore, four hook-shaped fixing pawls 53 (fixing member, positioning means) protruding downward are provided in the middle hole 49 of the center guide 51. The center guide 51 is designed to be fixed to the accommodating case 50 by these fixing pawls 53. The four (plurality of) fixing pawls 53 are aligned around the circumferential direction of the middle hole 49. The fixing pawls 53 protrude horizontally toward the inside of the middle hole 49, bend in the circumferential direction of the middle hole 49, and extend underneath the center guide 51, the tips thereof being formed into hook shapes.

Figure 14:
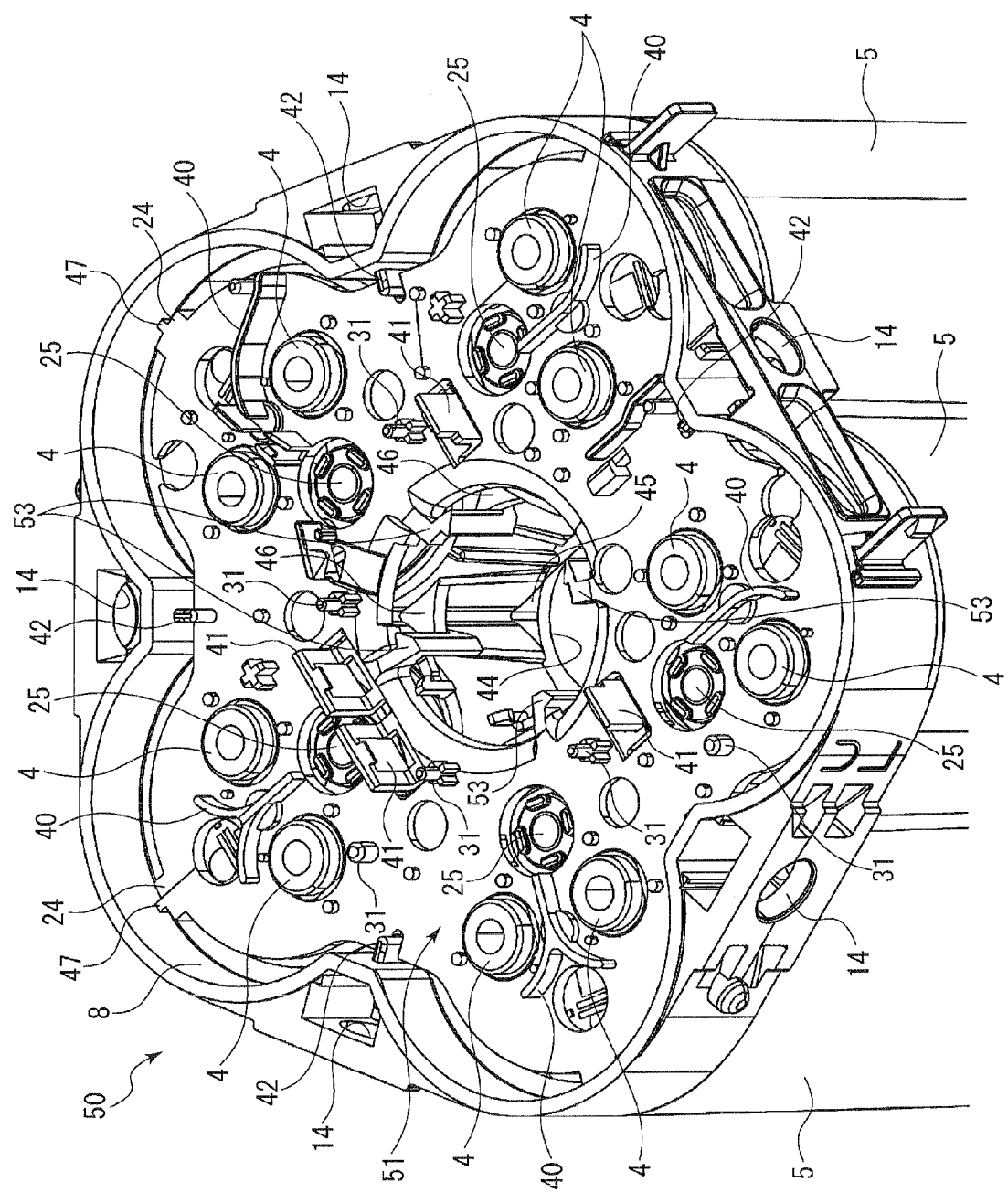
FIG. 14 is a perspective view showing the center guide as being attached to the accommodating case.

The fixing pawls 53 flex easily due to being bent in multiple directions in this manner, and when the center guide 51 is attached to the accommodating case 50, the fixing pawls 53 can flex and enable the center guide to attach easily. The top surfaces of the fixing pawls 53 of the center guide 51 are designed to engage with the bottom surfaces of the ridges 46 of the previously described accommodating case 50 as shown in FIG. 14. Furthermore, the hook-shaped tips of the two pairs of fixing pawls 53 are arranged so as to face in opposite directions, and the center guide 51 does not wobble when fixed in place.

The capacitor device 1 of the present embodiment is designed to be used as installed in a machine such as a vehicle via the accommodating case 3, and a load or vibration applied while the vehicle is traveling is applied to the capacitor main bodies 2 and the bus bars 18 as well. A load or vibration applied while the vehicle is traveling is transmitted to the center guide 51 from the capacitor main bodies 2 and bus bars 18 fixed to the plurality of insertion holes 26 and engaged holes 28 (engaged parts), and stress caused by such a load or vibration is applied to the center guide 51. However, due to the fixing pawls 53 of the center guide 51 being provided around the circumferential direction of the middle hole 49 as shown in FIG. 13, when a load or vibration is applied to the center guide 51, the stress caused by such a load or vibration is dispersed to the plurality of fixing pawls 53, and the fatiguing, cracking, or breaking of some of the fixing pawls 53 can be prevented.

The hook-shape formed tips of the fixing pawls 53 have tapered surfaces 54 which are inclined and made to protrude toward the outer periphery of the center guide 51 as shown in FIG. 13. When the center guide 51 is attached to the accommodating case 50, the tapered surfaces 54 of the fixing pawls 53 come in contact with the ridges 46 of the accommodating case 50, the tips of the fixing pawls 53 flex along the ridges 46 toward the center of the cylindrical hole 44 of the accommodating case 50, and the outside diameter easily constricts with the tips of the fixing pawls 53 in an aligned state. Having passed through the ridges 46, the tips of the fixing pawls 53 are returned to their original outside diameter, and the top surfaces of the fixing pawls 53 are easily interlocked with the bottom surfaces of the ridges 46. Due to the fixing pawls 53 of the center guide 51 being interlocked with the ridges 46 of the accommodating case 50 as shown in FIG. 14, the accommodating case 50 and the center guide 51 can be better fixed in place, and this is particularly effective in cases of the capacitor device 1 being applied to a vehicle subject to vibration.

In Embodiment 2 described above, the fixing pawls 53 (fixing member, positioning means) fixed to the ridges 46 (fixing base parts) of the accommodating case 50 are provided to an area enclosed by the plurality of insertion holes 26 and engaged holes 28 (engaged parts) in the center guide 51 (an element member), whereby the center guide 51 is fixed to the ridges 46 of the accommodating case 50 by the fixing pawls 53, and this fixed state is maintained while the area of the engaged parts surrounding the fixing pawls 53 of the center guide 51 is not fixed. Therefore, when a load or vibration acts on the center guide 51 from components such as the capacitor main bodies 2 or the bus bars 18 engaged with the insertion holes 26 and the engaged holes 28, the area of the insertion holes 26 and engaged holes 28 can flex to permit the load or vibration, stress caused by the load or vibration can be prevented from concentrating in certain areas of the fixing pawls 53 of the center guide 51, and weakening of the center guide 51 can be prevented.

Due to the center guide 51 (element member) having a circular shape and the plurality of fixing pawls 53 (fixing member, positioning means) being aligned in the circumferential direction around the peripheral edge of the middle hole 49 formed in the middle of the center guide 51, when a load or vibration acts on the center guide 51 from other members such as the capacitor main bodies 2 or bus bars 18 connected to the center guide 51, the stress caused by the load or vibration can be prevented from concentrating in the middle of the center guide 51, the stress is dispersed among the plurality of fixing pawls 53, and the fixing pawls 53 can therefore be prevented from weakening. The center guide 51 can also be reduced in weight and further strengthened due to the center guide 51 having a circular shape.

The center guide 51 (element member) is also provided with guide concavities 48 (interlocking parts) that interlock with the case convexities 42 (interlocked parts) formed between adjacent accommodating parts 5 in the accommodating case 50, and the center guide 51 is positioned relative to the accommodating case 50 with the guide concavities 48 in an engaged state with the case convexities 42, whereby the center guide 51 and the accommodating case 50 can be positioned relative to each other with precision, the capacitor main bodies 2 engaged with the center guide 51 can be arranged accurately within the accommodating parts 5, and because the case convexities 42 are formed between adjacent accommodating parts 5, the case convexities 42 do not interfere when the capacitor main bodies 2 are accommodated in the accommodating parts 5.

Embodiments of the present invention are described above according to the drawings, but the specific configuration is not limited to these embodiments, and the present invention includes alterations and additions within a range that does not deviate from the scope of the invention.

For example, in the previous embodiments, an example of an electric two-layer capacitor was presented as a capacitor, but the capacitor in which the present invention is applied is not limited as such can also be applied to various capacitors and electric capacitors such as electrolytic capacitors and electrochemical electric capacitors.

In the previous embodiments, examples of cylindrical capacitor main bodies 2 were presented, but the present invention is not limited as such and can also be applied to non-cylindrical capacitors shaped as polygons or the like. If the capacitor main bodies are polygonal, the accommodating parts of the accommodating case are preferably polygonal to match these polygonal shapes.

In the previous embodiments, five accommodating parts 5 are formed in a circle in one accommodating case 3, but the number and arranged form of the accommodating parts 5 are not particularly limited. At least two or three, or even six or seven or more accommodating parts 5 may be formed, and the accommodating parts 5 may be arranged in one row or multiple rows.

In the previous Embodiment 2, the center guide 51 was provided with a plurality of fixing pawls 53 as fixing member or positioning means, but the fixing member and positioning means of the present invention are not limited as such, and another option is to provided a single large pawl in the middle of the center guide 51, and to fix the center guide 51 to the accommodating case 50 by engaging this fixing pawl with the cylindrical hole 44 or the like of the accommodating case 50.

REFERENCE SIGNS LIST

1 Capacitor device
2 Capacitor main body
3 Accommodating case
4 Terminal part
5 Accommodating part
6 Sealing plate
7 Hollow part
8 Wall part
9 Opening
10 Tapered surface
11 Gap
12 Tapered surface
13 Rib (convexity)
14, 15 Nut holding parts
16 Lead-out hole
17 Resin material
18 Bus bar (connection member)
19 Circuit substrate (circuit part)
20 Circuit arrangement part
21 Cutout part (communication part)
22 Mound part (convexity)
23 Center guide (element member)
24 Curved piece (positioning means)
25 Pressure release mechanism (pressure release means)
26 Insertion hole
27 Terminal base
28 Engaged hole (engaged part)
29 Engaging convexity (engaging part)
30 Hole
31 Protruding rod (engaged part)
32 Closing plate
33 Fill hole
34 Protruding rod
35 Release hole
36 Through hole
37 Cylindrical part
38 Funnel part
39 Linking part
40 Bus bar engaging convexity (engaged part)
41 Interlocking pawl (engaged part)
42 Case convexity (interlocked part)
43 Contact surface
44 Cylindrical hole
45 Lead-out hole
46 Ridge
47 Protrusion
48 Guide concavity (interlocking part)
49 Middle hole
50 Accommodating case
51 Center guide
52 Bent edge
53 Fixing pawl (fixing member, positioning means)
54 Tapered surface

The invention claimed is:

1. A capacitor device having an accommodating case in which a plurality of accommodating parts for accommodating a capacitor main body are formed, said accommodating parts being oriented so that longitudinal directions thereof face a same direction, and the capacitor main bodies being accommodated in said accommodating parts with terminal part sides thereof arranged in a same orientation;

wherein said terminal part sides of said capacitor main bodies are provided with engaging parts that engage with engaged parts provided to a predetermined element member, said element member comprises a fixing member or members for fixing the element member to said accommodating case, said fixing member is provided to an area enclosed by said engaged parts in said element member, the fixing member is fixed to a fixing base part of said accommodating case, and said capacitor main bodies are accommodated all together in said accommodating case with the engaging parts engaged with said engaged parts.

2. The capacitor device according to claim 1, wherein said element member has a positioning element for positioning the element member and said accommodating case, and said capacitor main bodies are positioned relative to said accommodating case due to said element member being positioned within said accommodating case by the positioning element.

3. The capacitor device according to claim 2, wherein said positioning element is an interlocking part that interlocks with an interlocked part formed between adjacent said accommodating parts in said accommodating case, and said element member is positioned relative to said accommodating case with said interlocking part in an engaged state with said interlocked part.

4. The capacitor device according to claim 1, wherein insertion holes into which the terminal parts of said capacitor main bodies are inserted are formed in said element member, and the terminal parts protruding from the insertion holes are electrically connected by a connection member.

5. The capacitor device according to claim 1, wherein said engaging parts are provided to positions such that said capacitor main bodies are non-rotationally symmetrical about the longitudinal axes thereof.

6. The capacitor device according to claim 1, wherein a pressure release mechanism for releasing the pressure of gas produced within the capacitor main bodies is provided in proximity to said terminal parts, and release holes are formed in said element member in positions corresponding to said pressure release mechanism.

7. The capacitor device according to claim 1, wherein said capacitor device is provided with connection members and/or a circuit substrate for connecting the terminal parts of said capacitor main bodies together, and the connection members and/or the circuit substrate is provided with engaging parts for engaging with the engaged parts of said element member.

8. The capacitor device according to claim 1, wherein said element member is circular in shape, and said fixing member or members are arranged aligned around the circumferential direction on the peripheral edge of a middle hole formed in a middle of the element member.

9. The capacitor device according to claim 1, wherein each of said accommodating parts has a shape that matches an external shape of the capacitor main bodies, and internal peripheral surfaces of the accommodating parts are tapered surfaces that narrow towards the bottoms.

10. The capacitor device according to claim 1, wherein each internal peripheral surface of said accommodating parts is provided with a plurality of convexities that protrude toward the capacitor main bodies and are arranged evenly in circumferential directions of the internal peripheral surfaces of said accommodating parts.

11. The capacitor device according to claim 1, wherein said capacitor main bodies are accommodated in said accommodating parts from openings of said accommodating case, the openings are closed by closing plates, said accommodating case has a lead-out hole for leading gas released from a pressure release mechanism provided to said capacitor main bodies out of the accommodating case, the lead-out hole being provided to a position enclosed by said accommodating parts, the accommodating parts being integrally linked together, and a hollow part being provided for leading the gas led out from said lead-out hole to the exterior.

12. The capacitor device according to claim 11, wherein said accommodating parts are arranged in a circle, and said lead-out hole is provided in a middle of the accommodating parts.

13. A capacitor device having an accommodating case in which a plurality of accommodating parts for accommodating a capacitor main body are formed, said accommodating parts being oriented so that a longitudinal directions thereof face a same direction, and the capacitor main bodies being accommodated in said accommodating parts with terminal part sides thereof arranged in a same orientation;
  wherein said terminal part sides of said capacitor main bodies are provided with engaging parts that engage with engaged parts provided to a predetermined element member, and said capacitor main bodies are accommodated all together in said accommodating case with the engaging parts engaged with said engaged parts, and
  a pressure release mechanism for releasing the pressure of gas produced within the capacitor main bodies is provided in proximity to said terminal parts, and release holes are formed in said element member in positions corresponding to said pressure release mechanism.

14. A capacitor device having an accommodating case in which a plurality of accommodating parts for accommodating a capacitor main body are formed, said accommodating parts being oriented so that a longitudinal directions thereof face a same direction, and the capacitor main bodies being accommodated in said accommodating parts with terminal part sides thereof arranged in a same orientation;
  wherein said terminal part sides of said capacitor main bodies are provided with engaging parts that engage with engaged parts provided to a predetermined element member, and said capacitor main bodies are accommodated all together in said accommodating case with the engaging parts engaged with said engaged parts, and
  wherein said capacitor device is provided with connection members and/or a circuit substrate for connecting the terminal parts of said capacitor main bodies together, and the connection members and/or the circuit substrate is provided with engaging parts for engaging with the engaged parts of said element member.

* * * * *